United States Patent [19]

Hosoi et al.

[11] Patent Number: 5,153,817
[45] Date of Patent: Oct. 6, 1992

[54] ELECTRONIC APPARATUS SYSTEM INCLUDING AN EXPANSION DEVICE REMOVABLY CONNECTED TO A REMOVABLE BATTERY PACK

[75] Inventors: Takashi Hosoi, Tokyo; Toshio Kikukawa, Hanno; Keizo Ohgami; Takaichi Kobayashi, both of Tokyo, all of Japan

[73] Assignee: Kabushiki Kaisha Toshiba, Kawasaki, Japan

[21] Appl. No.: 653,402

[22] Filed: Feb. 8, 1991

[30] Foreign Application Priority Data

Feb. 9, 1990 [JP] Japan .................................. 2-30587
Jul. 10, 1990 [JP] Japan ................................ 2-181730
Jul. 10, 1990 [JP] Japan ................................ 2-181731

[51] Int. Cl.[5] .................. H05K 7/10; H05K 5/02; G06F 1/00; H01M 2/10
[52] U.S. Cl. ................................. 361/393; 361/380; 429/99
[58] Field of Search ................. 429/96, 97, 98, 99, 429/100; 364/708; 361/380, 390, 391, 392, 393, 394, 395, 399

[56] References Cited

U.S. PATENT DOCUMENTS

| | | |
|---|---|---|
| 4,002,892 | 1/1977 | Zielinski . |
| 4,464,445 | 8/1984 | Matti ...................................... 429/99 |
| 4,530,066 | 7/1985 | Ohwaki et al. ....................... 364/708 |
| 4,680,674 | 7/1987 | Moore ................................... 361/395 |
| 4,756,978 | 7/1988 | Nitcher et al. ..................... 429/96 X |
| 4,788,658 | 11/1988 | Hanebuth ......................... 364/708 X |
| 4,847,170 | 7/1989 | Martin ............................... 429/98 X |
| 4,858,162 | 8/1989 | Kieffer et al. . |
| 4,893,263 | 1/1990 | Myers .................................... 364/708 |
| 4,908,637 | 3/1990 | Chung et al. .................... 361/394 X |
| 4,980,856 | 12/1990 | Veno ..................................... 361/393 |
| 4,991,058 | 2/1991 | Watkins et al. ................. 364/708 X |
| 5,058,045 | 10/1991 | Ma ....................................... 364/708 |

FOREIGN PATENT DOCUMENTS

| | | |
|---|---|---|
| 191756 | 9/1957 | Austria .................................. 429/98 |
| 8909490 | 12/1989 | Fed. Rep. of Germany . |
| 49-25332 | 3/1974 | Japan . |
| 51-77033 | 6/1976 | Japan . |
| 53-29057 | 7/1978 | Japan . |
| 56-25476 | 3/1981 | Japan . |
| 58-44647 | 3/1983 | Japan . |
| 58-45980 | 3/1983 | Japan . |
| 58-116157 | 7/1983 | Japan . |
| 60-210480 | 10/1985 | Japan . |
| 60-170831 | 11/1985 | Japan . |
| 1520573 | 8/1978 | United Kingdom . |
| 2202381 | 9/1988 | United Kingdom . |

OTHER PUBLICATIONS

IBM Technical Disclosure Bulletin, vol. 27, No. 12, May 1985, pp. 6887-6890.

Primary Examiner—Gerald P. Tolin
Assistant Examiner—Michael W. Phillips
Attorney, Agent, or Firm—Oblon, Spivak, McClelland, Maier & Neustadt

[57] ABSTRACT

An expansion device includes a box-like device body and a second battery pack. The body includes a hard disc drive therein, a fitting recess open to the outer surface of the body, power-receiving terminals provided in the fitting recess and connected to the hard disc drive, and a second connector adapted to be connected to a first connector of a personal computer. The second battery pack is designed to be removably mounted in a battery mount portion, in place of a battery pack of the computer, and includes a coupling portion removably fitted in the fitting portion, the first and second power-supply terminals. When the second battery pack is mounted in the mount portion while the coupling portion is fitted in the fitting recess, the device body is coupled to the computer in a state where the second connector is connected to the first connector and the first and second power-supply terminals contact power-receiving terminals of the computer and the power-receiving terminals of the device body.

20 Claims, 22 Drawing Sheets

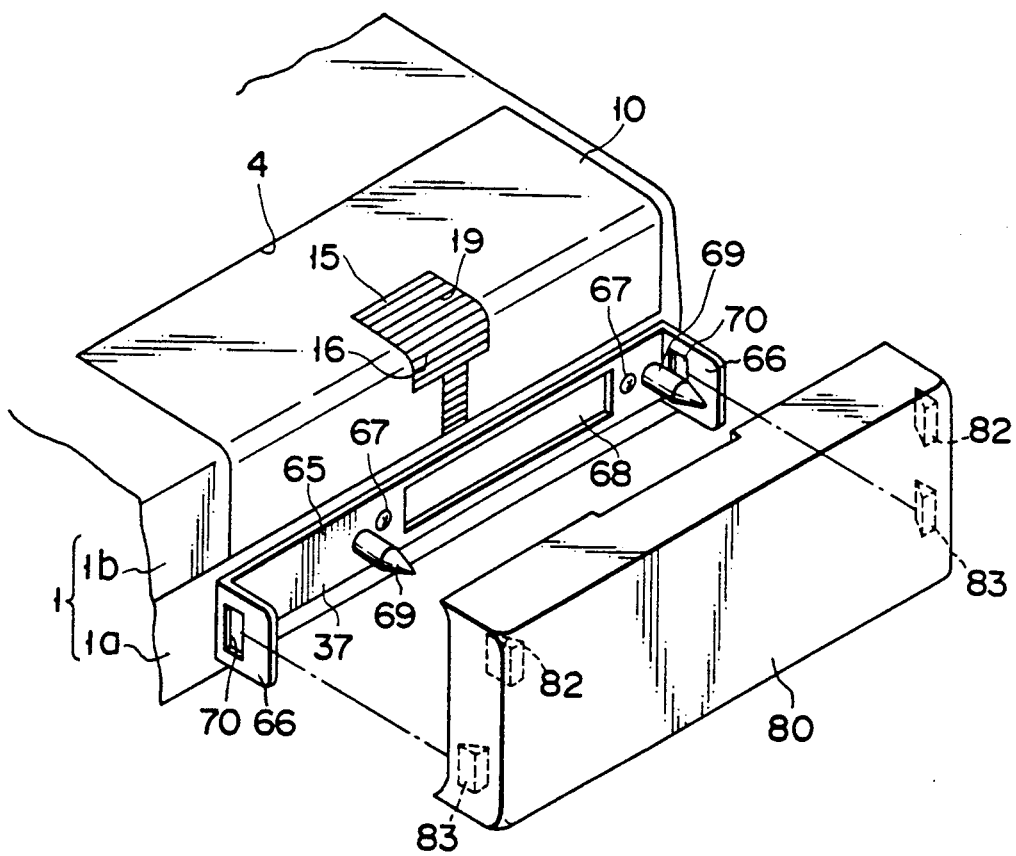
F I G. 14

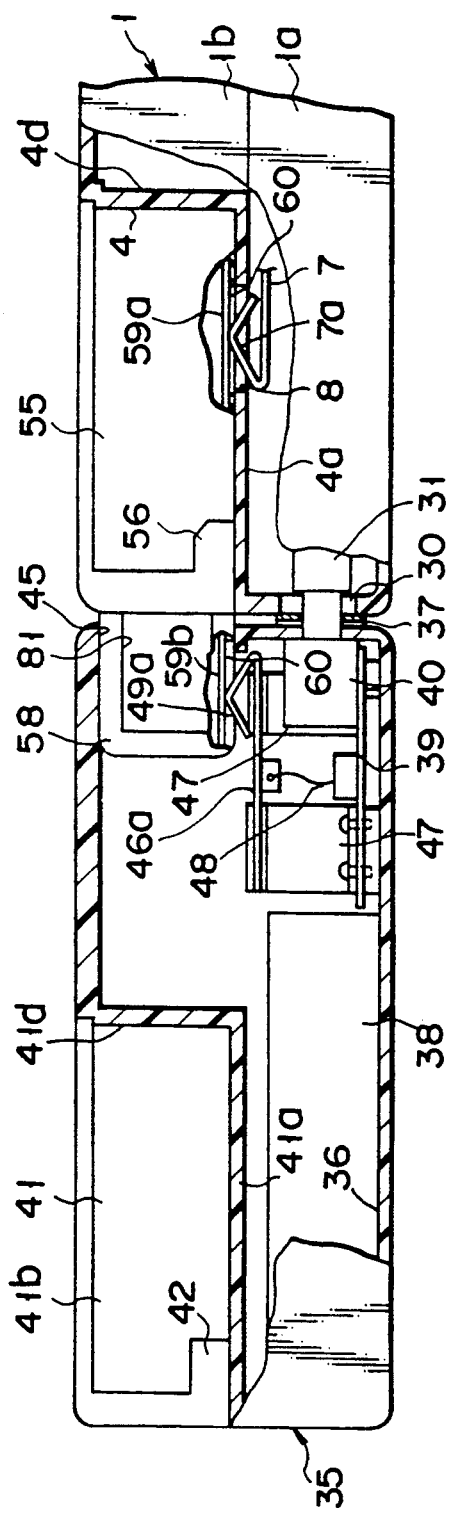
F I G. 15

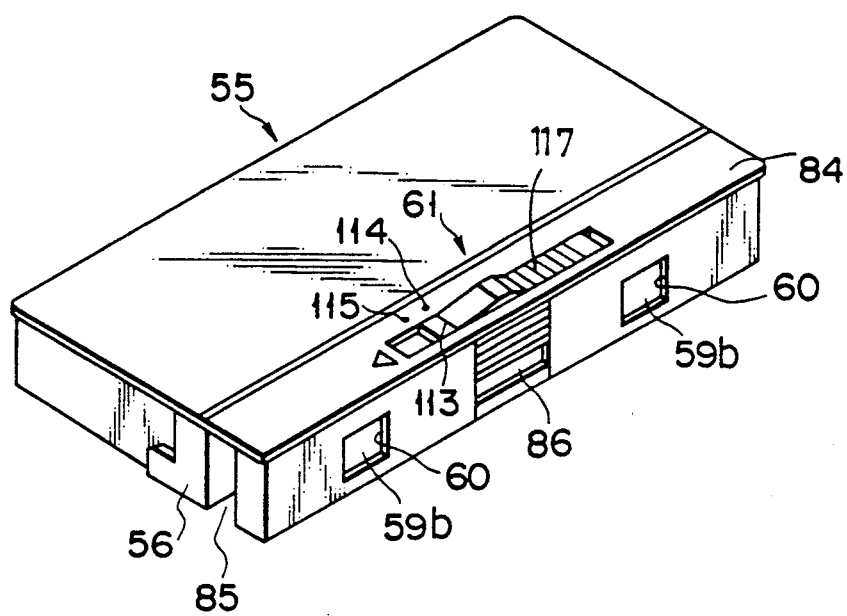
F I G. 18

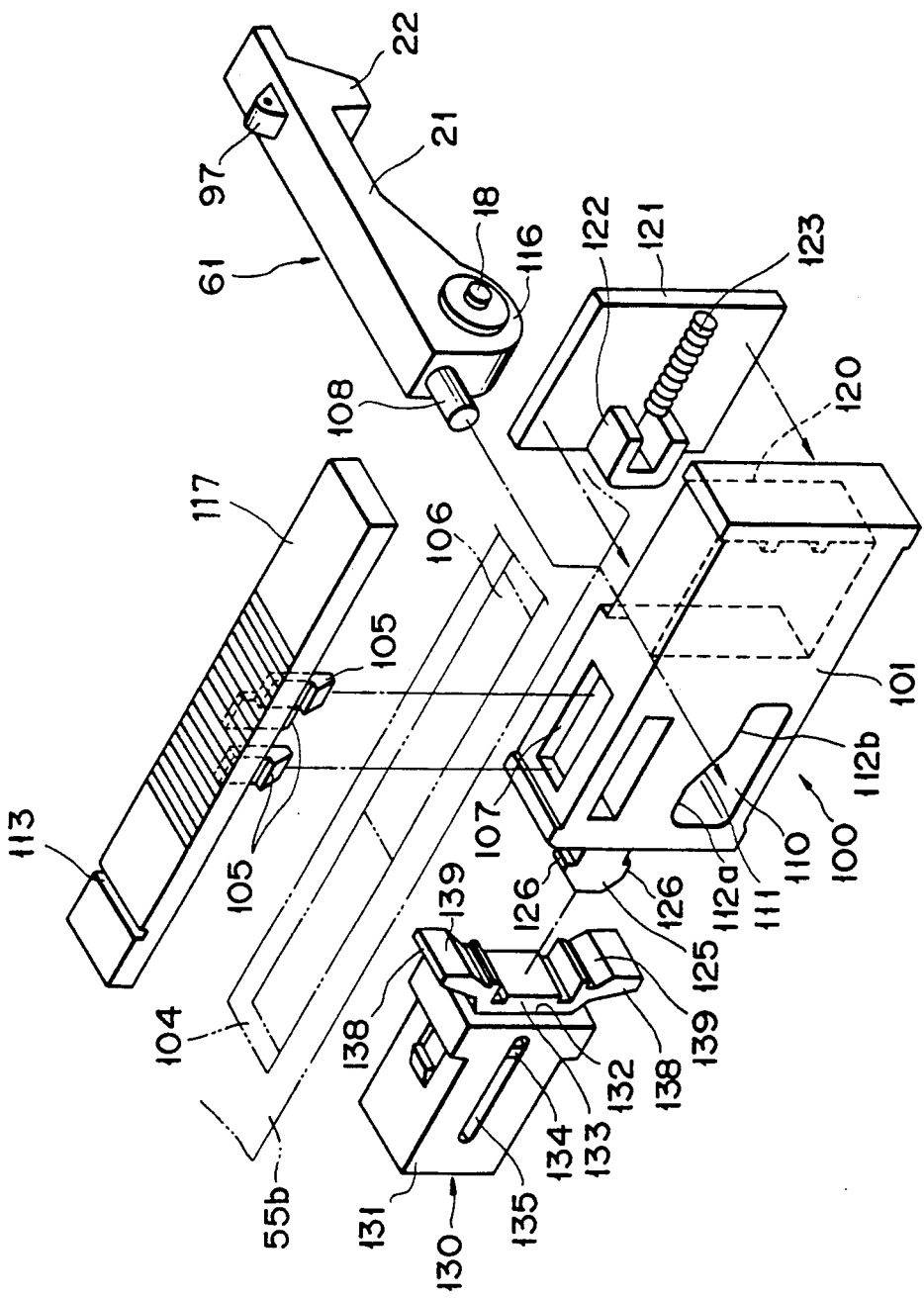
F I G. 19

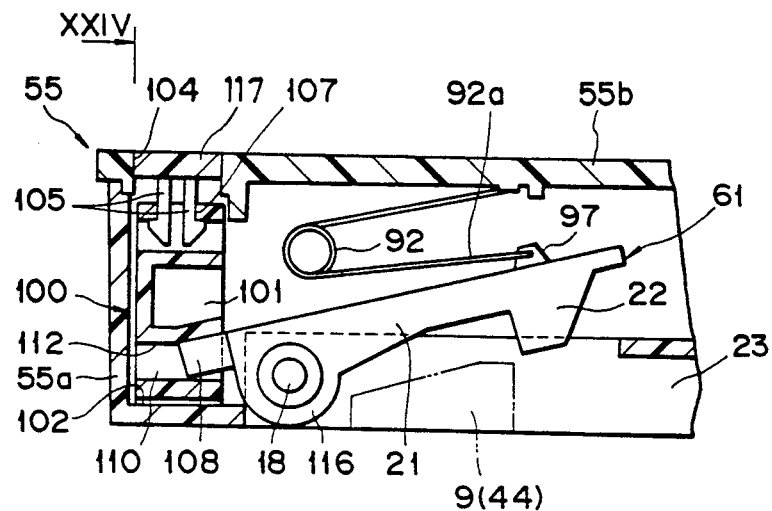
F I G. 20
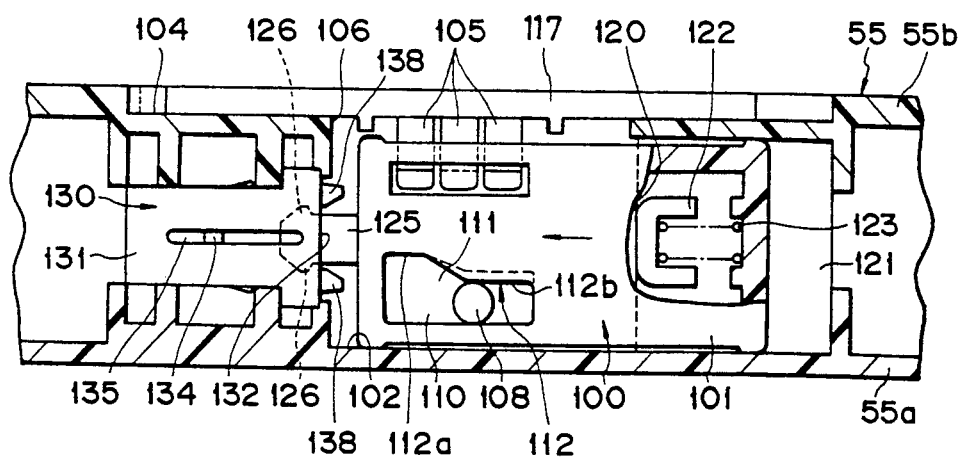
F I G. 21

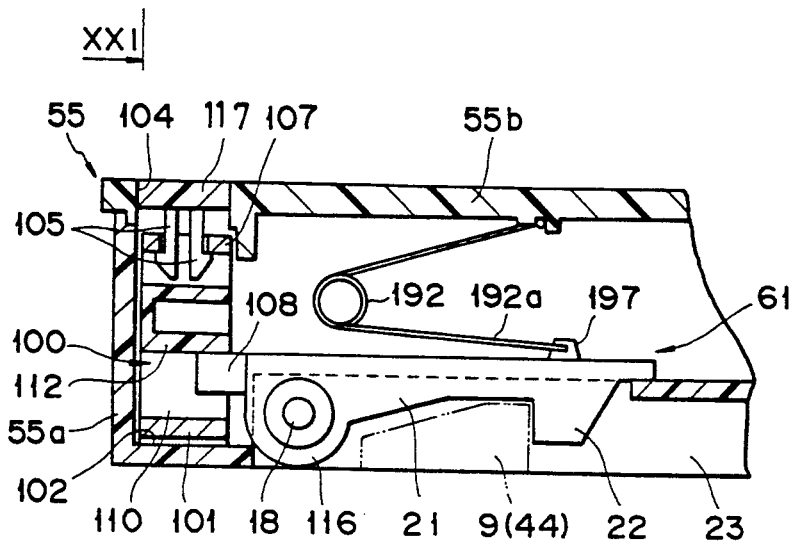
F I G. 23
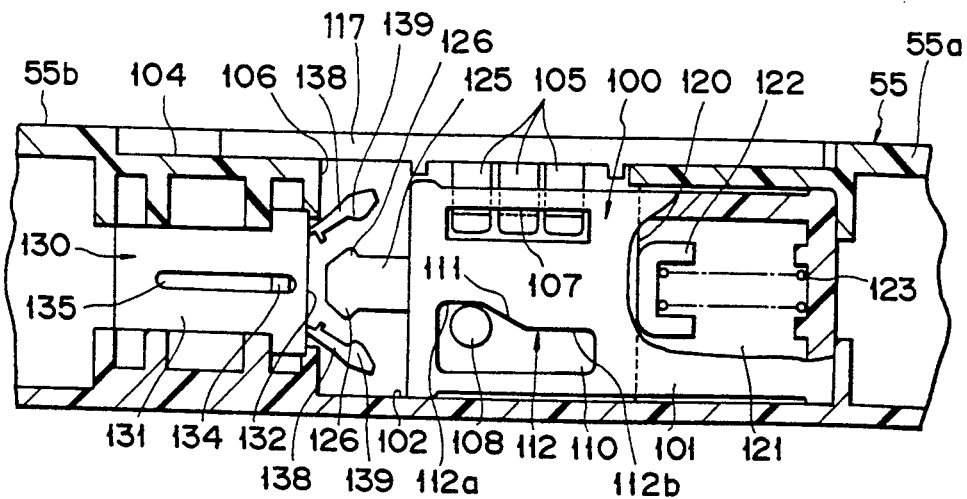
F I G. 24

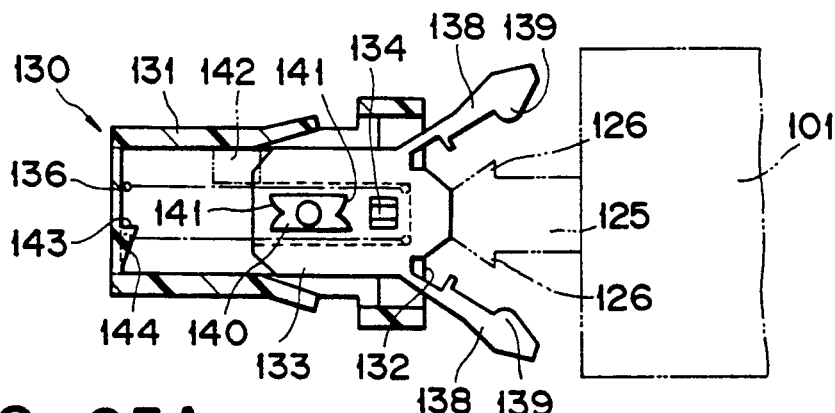
F I G. 25A
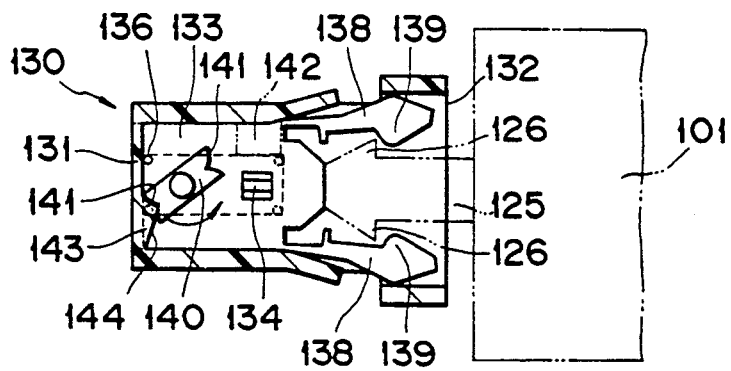
F I G. 25B
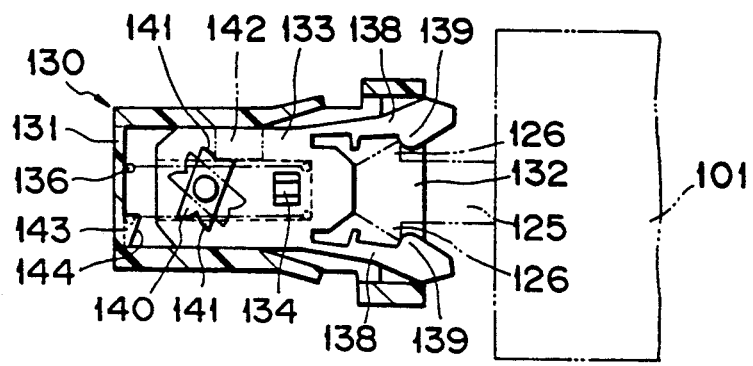
F I G. 25C

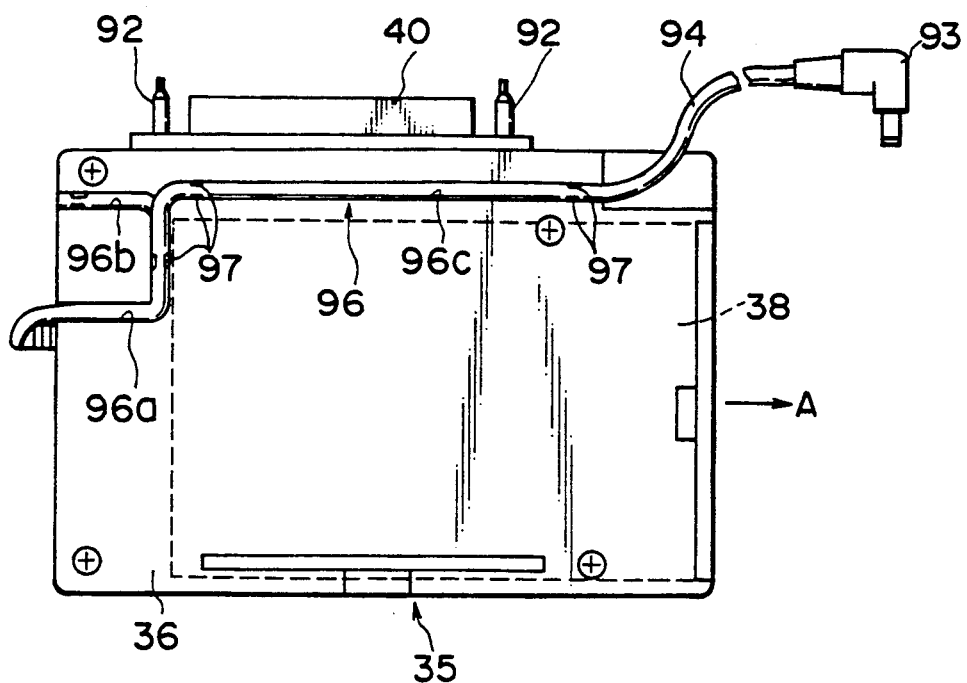
F I G. 26

ELECTRONIC APPARATUS SYSTEM INCLUDING AN EXPANSION DEVICE REMOVABLY CONNECTED TO A REMOVABLE BATTERY PACK

BACKGROUND OF THE INVENTION

1. Field of the Invention

The present invention relates to an expansion device connected to a compact electronic apparatus capable of being battery-driven, such as a lap-top type personal computer, a word processor, or the like, thereby expanding the functions of the electronic apparatus.

2. Description of the Related Art

One of conventionally known portable personal computers comprises a substantially rectangular-box like housing. A keyboard is situated at the front part of the housing, and a flat-panel type display is rotatably mounted on the rear of the keyboard.

In this type of personal computer, in order to enhance the portability, a rechargeable battery pack is removably attached to the housing and is used as a driving power source.

Recently, there has been a demand for a memory, a printer or a hard-disc drive unit be connected to this portable personal computer, where necessary, thereby expanding the computer functions of the portable personal computer up to the level of a desk-top type computer.

The above type of portable personal computer, however, has a thin, compact housing for achieving high portability. It is, therefore, practically impossible to keep the space within the housing for installation of an expansion device.

Under the situation, an expansion device, such as a hard-disc drive unit, for example, is installed outside the computer housing and is connected to the computer through a connector exposed on the rear face of the housing. In this case, a power source for driving the expansion device must be provided separately.

Accordingly, in order to expand the functions of the computer, a power source used exclusively for the expansion device must be provided, along with the expansion device itself. Thus, the computer, if associated with the expansion device and power source therefor, becomes very large in size and heavy. This deteriorates the portability of the computer.

SUMMARY OF THE INVENTION

The present invention has been made in consideration of the above circumstances, and its object is to provide an expansion device for a compact electronic apparatus, wherein the compact electronic apparatus and the expansion device can be driven by a common battery pack and the size of the combination of the electronic apparatus and expansion device can be reduced.

In order to achieve the above object, the expansion device according to this invention comprises a device body containing means for expanding the functions of the electronic apparatus, and an expansion-side battery pack. The expansion-side battery pack has substantially the same shape as the electronic apparatus-side battery pack, and is capable of being removably mounted in a battery mount portion of the electronic apparatus. The expansion-side battery pack has a first power-supply terminal, which can be electrically connected to power-receiving terminals provided at the mount portion, and a second power-supply terminal exposed outwards when the battery pack is mounted in the mount portion. The device body has a second connector which is exposed outward and connectable with a first connector of the electronic apparatus, and a power-receiving terminal connected to the expanding means. When the device body is coupled to the electronic apparatus with the expansion-side battery pack being mounted on and electrically connected to the electronic apparatus, the second connector is removably connected to the first connector and simultaneously the power-receiving terminal of the device body contacts the second power-supply terminal of the expansion-side battery pack, whereby the battery pack is electrically connected to the expanding means.

According to the expansion device with the above structure, the expansion device body is coupled to the housing of the electronic apparatus in the following manner. First, the electronic apparatus-side battery pack is removed from the apparatus housing, and the expansion-side batter pack is removed from the device body. The removed expansion-side battery pack is fitted to the battery mount portion of the housing, and thus, it is electrically connected to the apparatus. Then, the expansion device body is coupled to the housing through coupling means, so that the connectors of the housing and the device body are mutually connected and the electronic circuit of the electronic apparatus is electrically connected to the expanding means.

Simultaneously, the second power-supply terminal of the expansion-side battery pack is connected to the expansion device through the power-receiving terminal thereof. Thus, the expansion-side battery pack supplies electric power both to the electronic circuit of the electronic apparatus and the expansion means of the expansion device, and they can be commonly driven by the single power source.

In addition, according to the present invention, the expansion-side battery pack has a coupling portion which projects from the apparatus housing towards the expansion device body, when the expansion-side battery pack is mounted in the mount portion of the electronic apparatus. The device body has a fitting portion into which the coupling portion of the battery pack can be engaged. The device body is mechanically coupled to the housing of the electronic apparatus by the engagement between the coupling portion and the fitting portion and the connection between the first and second connectors. The expansion device can be easily attached to and removed from the electronic apparatus, without the need to attach a special coupling member to the housing of the electronic apparatus.

Furthermore, according to the present invention, the expansion device body has a battery mount unit to which the expansion-side battery pack and the electronic apparatus-side battery pack can be mounted selectively and removably. When the device body is coupled to the apparatus housing, the apparatus-side battery pack removed from the housing can be mounted in the mount portion of the device body, in place of the expansion-side battery pack. The battery mount portion of the device has a power-receiving terminal which contacts the power-supply terminal of the apparatus-side battery pack, thus electrically connecting the apparatus-side battery pack to the expanding means of the expansion device.

According to the above structure, when the apparatus-side battery pack removed from the electronic apparatus is fitted to the battery mount portion of the expansion device, the battery pack is electrically connected to the expanding means. Thus, the expanding means can be supplied with electric power from not only the expansion-side battery pack but also from the apparatus-side battery pack. Accordingly, the power consumption of the battery pack can be reduced and the operating time of the small electronic apparatus can be prolonged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 7 show a personal computer to which an expansion device according to this invention is connected, in which FIG. 1 is a perspective view of the computer;

FIG. 2 is a perspective view of the computer, as viewed from the rear side thereof, in the state in which a display unit is closed;

FIG. 3 is a perspective view showing the state in which a apparatus-side battery pack is separated from the housing of the computer;

FIG. 4 is a bottom view of the apparatus-side battery pack;

FIG. 5 is a cross-sectional view taken along line V—V in FIG. 4;

FIG. 6 is a cross-sectional view of a locking mechanism of the battery pack; and FIG. 7 is a cross-sectional view showing the state in which the apparatus-side battery pack is attached to a battery mount portion;

FIGS. 8 to 14 show an expansion device according to a first embodiment of the invention, in which FIG. 8 is an exploded perspective view of the expansion device;

FIG. 9 is a cross-sectional view showing the state in which the expansion device is connected to the computer;

FIG. 10 is a perspective view showing the state in which the expansion device is connected to the computer;

FIG. 11 is a perspective view of the expansion device, as viewed from the front side thereof;

FIG. 12 is a cross-sectional view of a coupling portion between the expansion device and the computer;

FIG. 13 is a perspective view of the expansion apparatus; and

FIG. 14 is a perspective view showing a coupling member attached to the housing of the computer;

FIG. 15 is a cross-sectional view showing a modification of the first embodiment and corresponds to FIG. 9; and FIGS. 16 to 29 show an expansion device according to a second embodiment of the invention, in which FIG. 16 is an exploded perspective view showing the device body and the battery pack;

FIG. 17 is a bottom view of the device-side battery pack;

FIG. 18 is a perspective view of the battery pack;

FIG. 19 is an exploded perspective view showing a fixing mechanism and a locking mechanism;

FIG. 20 is a cross-sectional view taken along line XX—XX in FIG. 17;

FIG. 21 is a cross-sectional view taken along line XXI—XXI in FIG. 20;

FIG. 22 is a plane view of the battery pack while a top plate of the battery pack is removed;

FIG. 23 is a cross sectional view corresponding to FIG. 20, showing a state wherein the operation lever is located at its release position;

FIG. 24 is a cross-sectional view taken along line XXIV—XXIV in FIG. 23;

FIGS. 25A to 25C are cross-sectional views schematically showing different operations of a latch device;

FIG. 26 is a bottom view of the device body;

FIG. 27 is an exploded perspective view showing the computer and the expansion device, in the state wherein these have not bee connected;

FIG. 28 is a sectional view showing the state wherein the expansion device is connected to the computer; and FIG. 29 is a perspective view showing the expansion device connected to the computer.

DETAILED DESCRIPTION OF THE PREFERRED EMBODIMENTS

With reference to the accompanying drawings, a detailed description will now be given of an embodiment wherein the present invention is applied to a hard-disc drive unit adapted to be connected to a lap-top personal computer.

First, the personal computer to which the drive unit is connected will be described.

Figure 1:
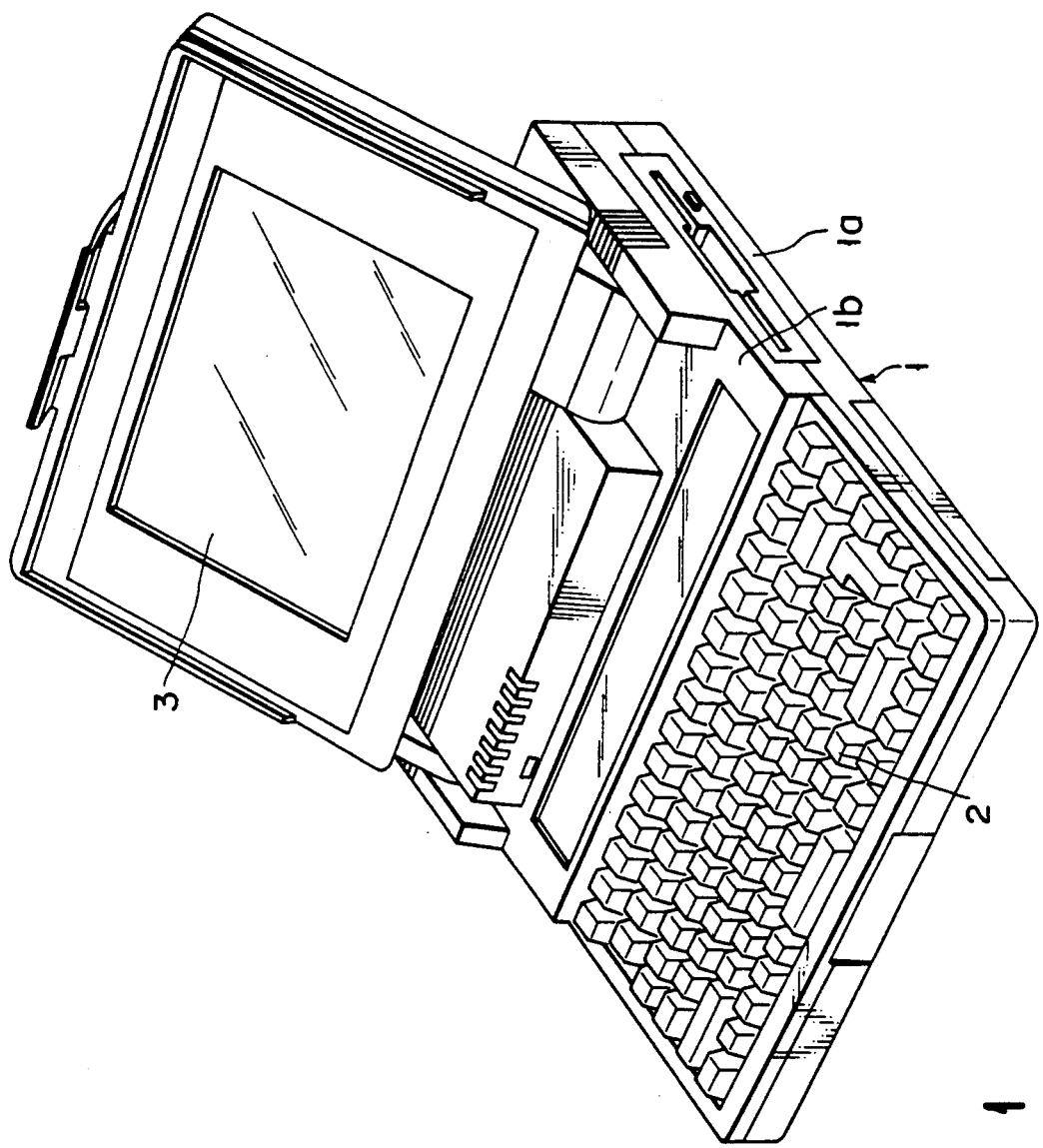
Figure 2:
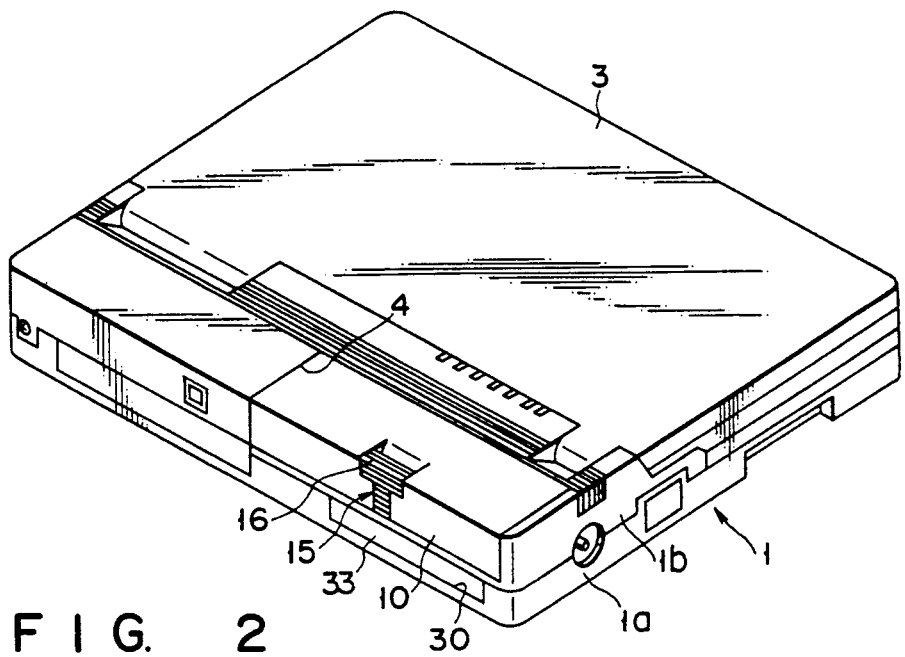

As is shown in FIGS. 1 and 2, the personal computer has a housing 1 which has a rectangular shape in plan view, and is formed in a box-like shape. The housing 1 comprises a bottom casing 1a forming a bottom plate, and a top cover 1b covering the upper opening of the bottom casing 1a. The front part of the top cover 1b is formed on a lower level than the rear part thereof. A keyboard 2 is built in the upper surface of the front part of the top cover 1b.

A flat-panel display unit 3 is arranged at the rear of the keyboard 2. The unit 3 is attached to the housing 1 so as to be rotatable between a closed position in which the unit 3 covers the keyboard 2 and an open position in which the unit 3 is erected in rear of the keyboard 2. When the display unit 3 is rotated to the closed position, the rear surface of the unit 3 becomes flush with the upper surface of the top cover 1b, as shown in FIG. 2.

The housing 1 contains a printed wiring board 29 (see FIG. 9) on which electronic parts such as ICs are mounted. Electronic circuits on the printed wiring board 29 are electrically connected to the keyboard 2 and display unit 3.

Figure 3:
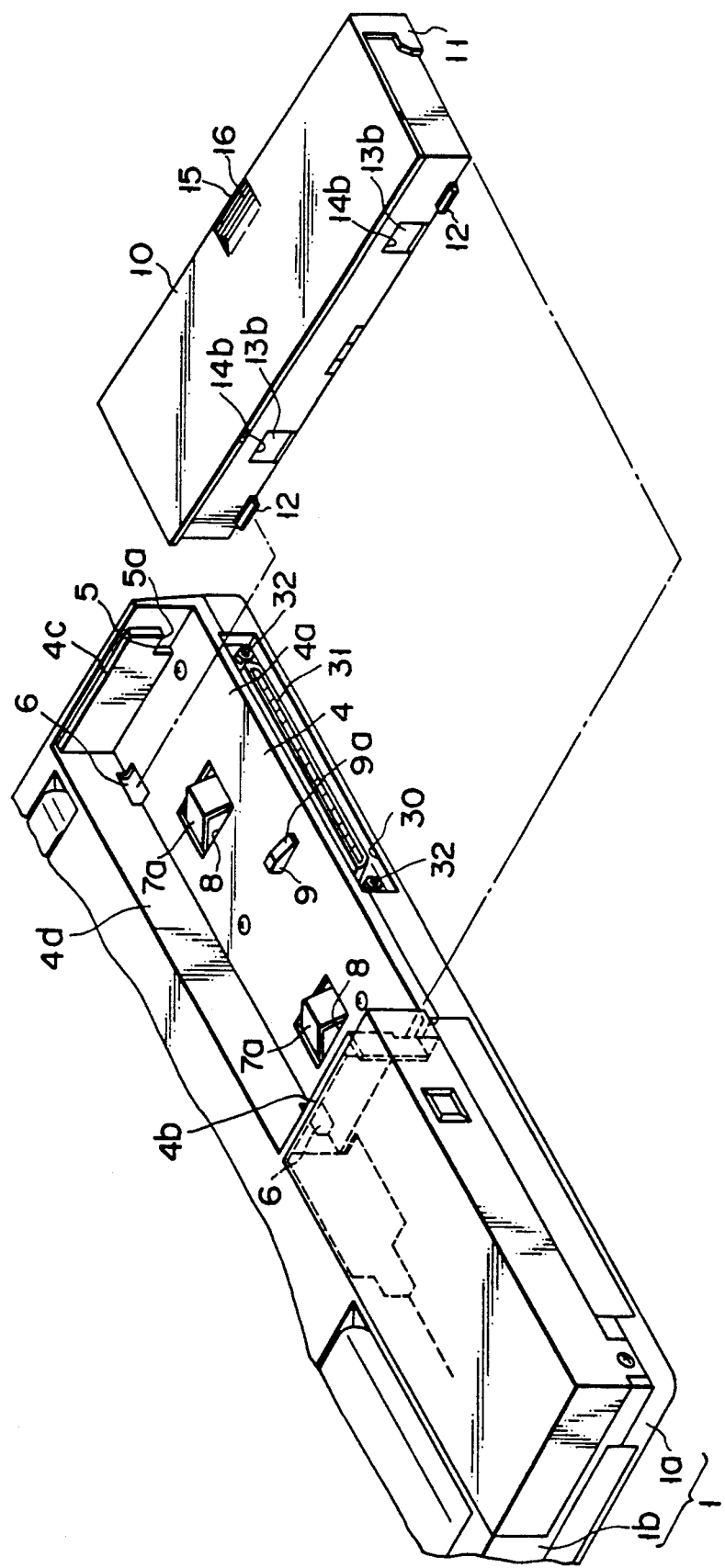

A battery mount portion 4 extending in the width direction of the housing 1 is provided at the rear part of the housing 1, that is, on the rear side of the top cover 1b behind the display 3. As is shown in FIGS. 2 and 3, the mount portion 4 is formed of a rectangular-parallelepiped recess defined by a bottom wall 4a, left and right walls 4b and 4c and a front wall 4d, which walls are integral with the top cover 1b. The recess is open to the top surface of the housing 1 and the rear surface continuous with this top surface. Hooks 5 are formed on the left and right walls 4b and 4c so as to face each other. Each hook 5 is formed by cutting out a lower rear end portion of each of the walls 4b and 4c. Each hook 5 has a hooking face 5a opposing the bottom wall 4a at a predetermined distance.

A corner portion defined by the bottom wall 4a and front wall 4d is provided with a pair of engaging holes 6. The engaging holes 6 are distanced in the width direction of the mount portion 4. In this embodiment, each hole 6 is elongated in the width direction of the portion 4.

A pair of left and right power-receiving terminals 7 (FIG. 9) are arranged within the housing 1 below the bottom wall 4a. Each terminal 7 has an upwardly bent contact 7a. Each contact 7a is exposed to the mount portion 4 through a through-hole 8 formed in the bottom wall 4a. The contacts 7a are distanced in the width direction of the mount portion 4. An anti-removal projection 9 is integrally formed on the bottom wall 4a at a mid-portion between the terminals 7. The projection 9 has an inclined top surface 9a extending upwards from the rear to the front.

A computer-side battery pack 10 is fitted to the battery mount portion 4 having the above structure so as to be removable from the rear side of the housing 1 The battery pack 10 is rechargeable and functions as a power source for the personal computer. As is shown in FIGS. 2 and 3, the battery pack 10 has a rectangular-parallelepiped shape having substantially the same dimensions as the mount portion 4. In the state wherein the battery pack 10 is attached to the mount portion 4, the upper and rear surfaces of the battery pack are exposed to the outside and are flush with the upper and rear surfaces of the housing 1. That is, the upper and rear of the battery pack 10 constitute part of the outer surfaces of the housing 1.

Figure 4:
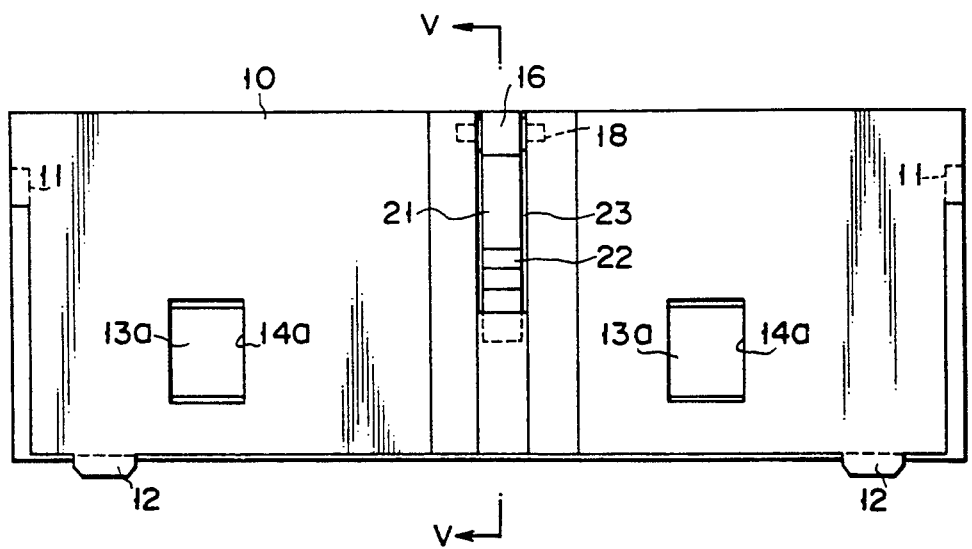

As is shown in FIGS. 3 and 4, the right and left side surfaces of the battery pack 10 have guide projections 11, which engage the hooks 5 when the pack 10 is fitted in the mount portion 4. In addition, on the front surface of the battery pack 10 are provided engaging projections 12 which are removably inserted into the engaging holes 6, respectively. The bottom and front walls of the battery pack 10 have a pair of right and left rectangular terminal windows 14a and a pair of right and left rectangular terminal windows 14b. First power-supply terminals 13a are exposed from the terminal windows 14a, and second power-supply terminals 13b are exposed from the terminals windows 14b. One pair of power-supply terminals 13a and 13b and the other pair of power-supply terminals 13a and 13b are formed of common terminal metal pieces, respectively. The paired metal pieces are electrically connected to a plurality of batteries (not shown) housed in the battery pack 10. When the battery pack 10 is mounted in the mount portion 4, the first power-supply terminals 13a exposed from the bottom terminal windows 14a contact the contacts 7a of the power-receiving terminals 7 in the mount portion 4.

Figure 5:
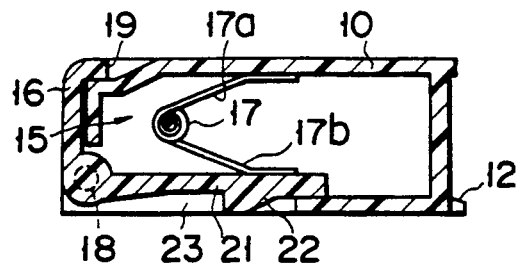

At a middle part of the battery pack 10 is provided a fixing mechanism 15 for holding the battery pack in the mount portion 4. As is shown in FIGS. 4 and 5, the fixing mechanism 15 comprises an operation lever 16 rotatably supported on the battery pack 10, and a torsion coil spring 17 for urging the operation lever 16 in the clockwise direction.

The operation lever 16 has a substantially L-shaped cross section. The bent portion 16a of the lever 16 is rotatably supported on the battery pack 10 by means of a shaft 18. One end portion of the lever 16 constitutes a finger hook 19 which is exposed over an area extending from the rear surface to the upper surface of the battery pack 10. When viewed from the rear side of the pack 10, the finger hook 19 has an almost T-shape. The T-shaped portion of the hook 19 is fitted in a groove 20 (see FIG. 6) formed in the rear surface of the battery pack 10, such that the T-shaped portion is flush with the rear surface of the pack.

The other end portion of the operation lever 16 constitutes an engaging arm 21 extending along the bottom surface of the battery pack 10. The arm 21 is arranged in an opening 23 formed in the bottom of the battery pack 10. On the bottom surface of the engaging arm 21 is formed a claw 22 which is adapted to engage the anti-removal projection 9.

The spring 17 is contained within the battery pack 10. One arm 17a of the spring 17 is put in contact with the upper surface of the battery pack 10, and the other arm 17b is put in contact with the upper surface of the engaging arm 21. The operation lever 16 is urged clockwise (in FIG. 5) about the shaft 18, thereby urging the claw 22 downwards.

The battery pack 10 will be attached to the battery mount portion 4 in the following manner. While holding the battery pack 10 by hand, it is inserted into the mount portion 4 from the rear side of the housing 1. A pair of guide projections 11 are engaged with the hook surfaces 5a of the hooks 5, and the engaging projections 12 are engaged with the opening edges of the engaging holes 6. The side walls 4b and 4c of the mount portion 4 restricts the lateral movement of the battery pack 10, and the engagement between the guide projections 11 and the engaging projections 12 restricts the vertical movement of the pack 10. In this manner, the pack 10 is attached to the unit 4. At this case, the first power-supply terminals 13a of the battery pack 10 contact the contacts 7a of the power-receiving terminals 7, respectively.

Figure 6:
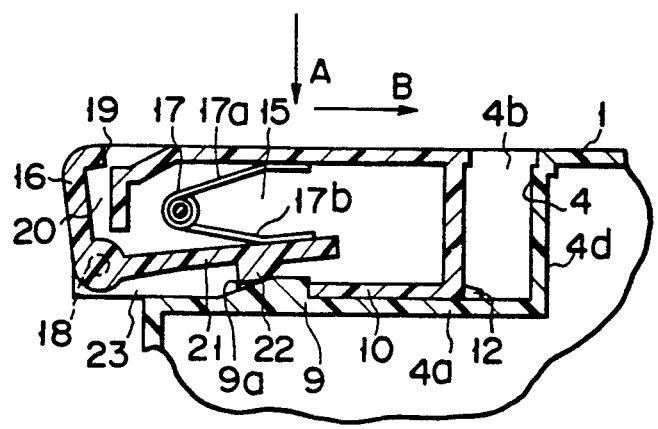

Upon fitting the battery pack 10 in the mount portion 4, the claw 22 of the engaging arm 21 moves over the inclined surface 9a of the anti-removal projection 9, as shown in FIG. 6, and the operation lever 16 is rotated counterclockwise against the urging force of the coil spring 17. Once the pack 10 has completely been inserted into the mount portion 4, the claw 22 moves beyond the projection 9, and the operation lever 16 is forcibly rotated clockwise by the spring 17. Thus, the claw 22 is engaged with the projection 9. In other words, as is shown in FIG. 7, the battery pack 10 is mounted in the mount portion 4 in the state in which the removal of the pack 10 is prevented.

The method of attaching the battery pack 10 is not limited to the above-mentioned embodiment in which the pack 10 is inserted from the rear side of the housing 1. For example, the battery pack 10 may be fitted in the mount portion 4 from the above, as indicated by arrow A in FIG. 6, and thereafter slide the pack 10 toward the front, as indicated by arrow B.

The battery pack 10 is removed from the battery mount portion 4, such that the finger hook 19 of operation lever 16 is pressed rearwards by the finger and the pack 10 is moved backwards.

Figure 7:
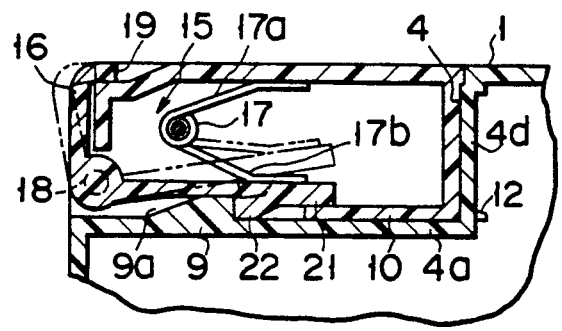

When the finger hook 19 is pushed rearwards, the operation lever 16 is rotated counterclockwise against the urging force of the torsion coil spring 17, as indicated by two-dot-and-dash lines in FIG. 7. Consequently, the claw 22 of the engaging arm 21 is disengaged from the anti-removal projection 9, and the fixation of the battery pack 10 by means of the fixing mechanism 15 is released and the pack 10 can be pulled out of the mount portion 4.

As is shown in FIG. 3, the rear wall of the bottom casing 1a has a laterally elongated opening 30 below the battery mount portion 4. A pin-terminal type first connector 31 is provided within the opening 30. The first connector 31 is attached to the printed wiring board 29 contained in the housing 1. Heads 32 of bolts for fixing the connector 31 to the housing 1 are exposed at both sides of the connector 31. Screw holes 32a (see FIGS. 3 and 12) are formed in the heads 32 and directed rearwards through the opening 30.

The opening 30 of the bottom casing 1a is normally covered with a removable cap (not shown).

Figure 8:
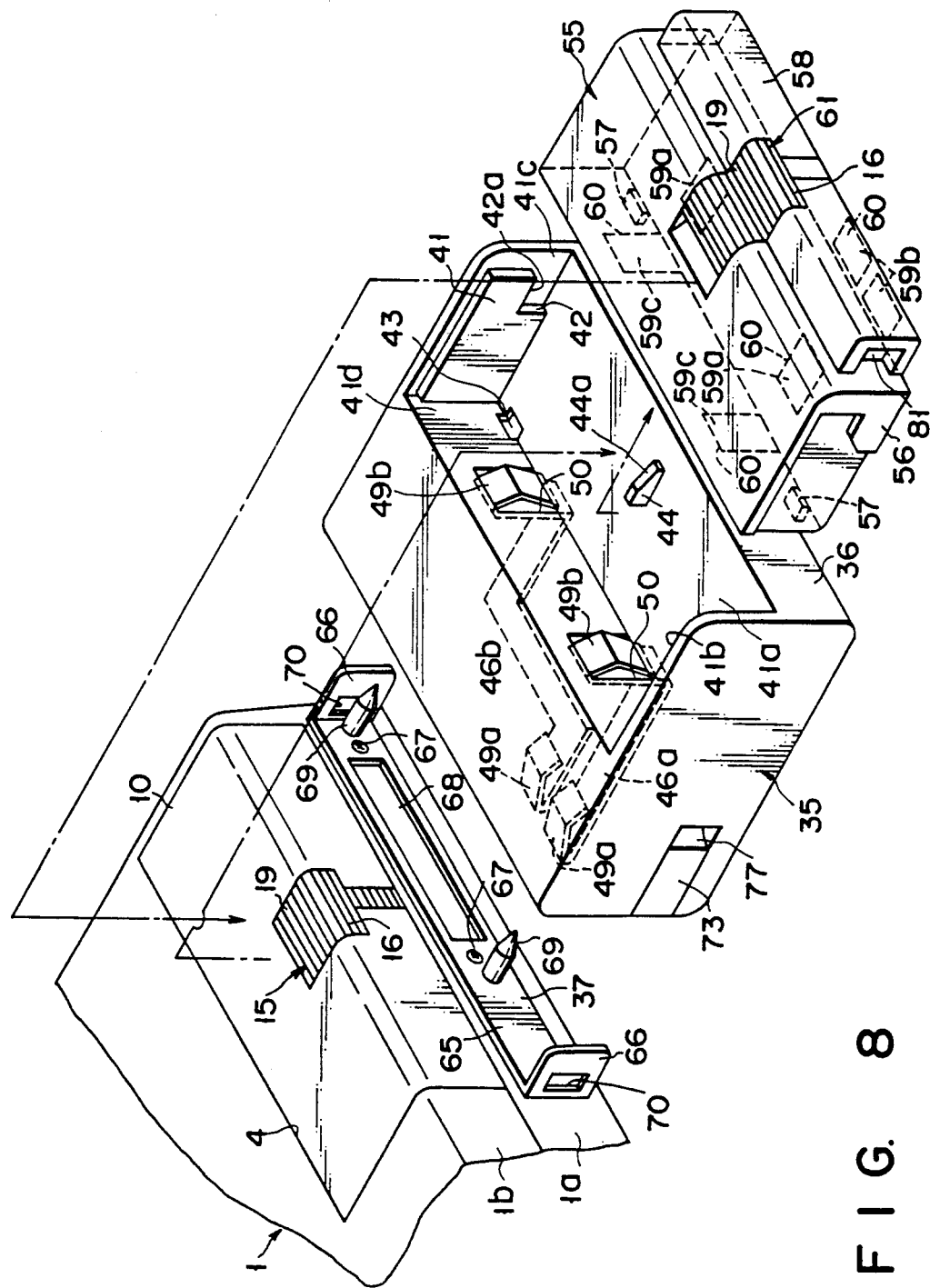
Figure 9:
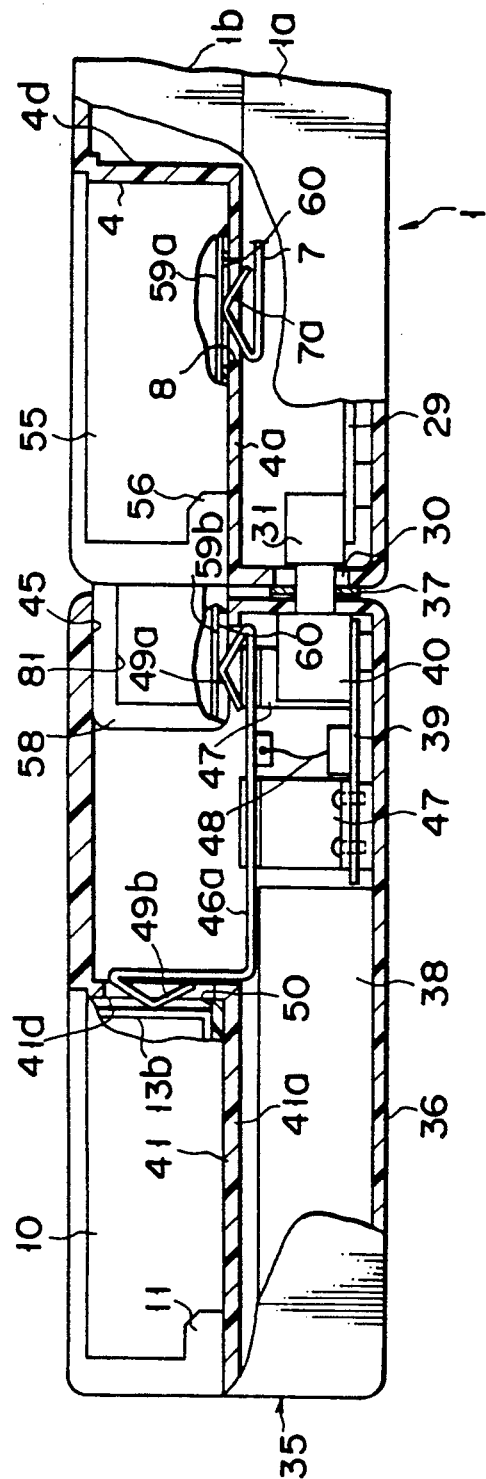
Figure 10:
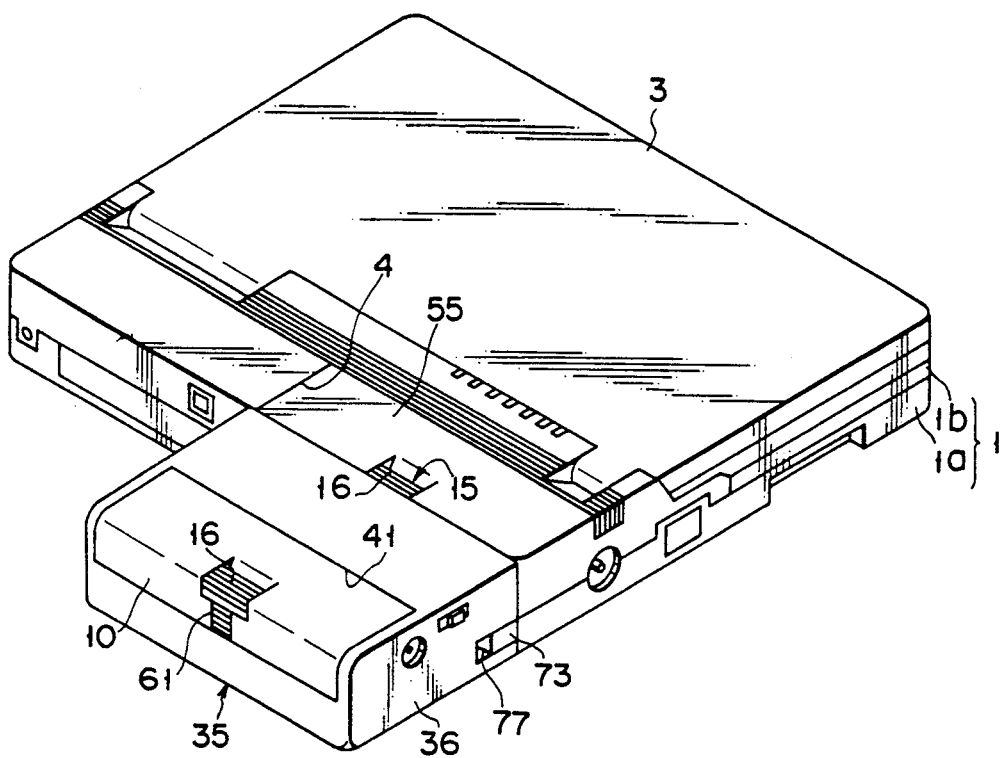

As is shown in FIGS. 8 to 10, a hard-disc drive unit 35 for expanding the computer function is removably connected to that part of the rear surface of the housing 1, at which the first connector 31 is situated. The unit 35 will now be described in detail.

The unit 35 comprises a unit body 36 with a substantially rectangular box-like shape, a unit-side battery pack 55, and a bracket 37 for coupling the body 36 to the computer housing 1.

Figure 11:
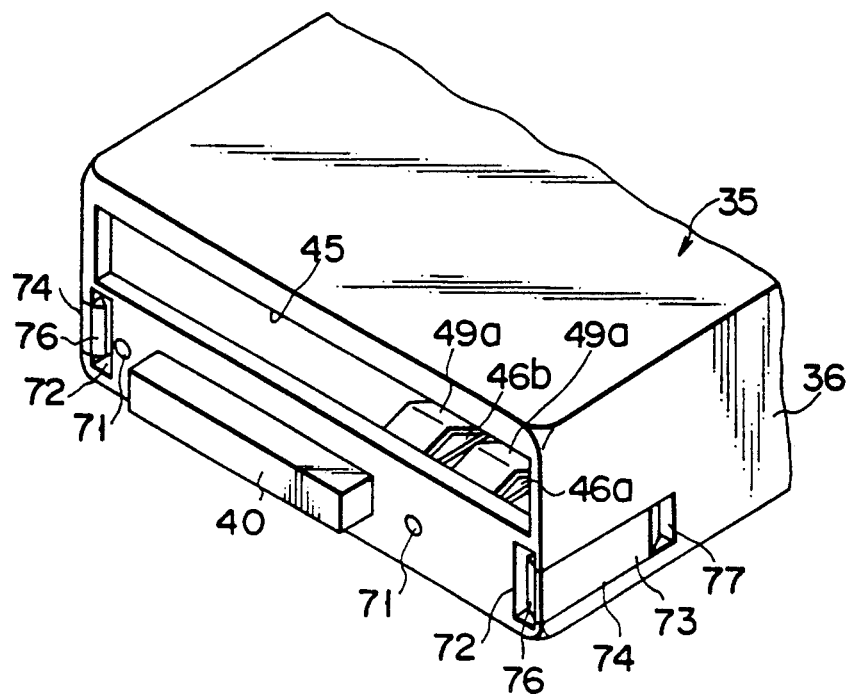

The unit body 36 has the same thickness as the housing 1. The body 36 contains a hard-disc drive (HDD) 38 as expansion means for expanding computer functions. Within the body 36 a printed wiring board 39 is situated adjacent to the HDD 38. The printed wiring board 39 is connected to the HDD 38, and a pin-terminal type second connector 40 mated with the computer-side first connector 31 is mounted on the board 39. As is shown in FIGS. 9 and 11, the second connector 40 projects from the front surface of the body 36, extends in the width direction of the body 36, and is removably connected to the first connector 31 on the housing 1.

In the upper rear portion of the unit body 36, that is, the upper side of the portion opposite to the second connector 40 is formed an elongated battery mount portion 41 extending in the width direction of the body 36. The mount portion 41 has a rectangular-parallelepipedic recess opening to the upper surface of the body 36 and the rear surface continuous with this upper surface. The mount portion 41 has the same structure and dimensions as those of the computer-side battery mount portion 4.

Specifically, the mount portion 41 is constituted by a bottom wall 41a, left and right side walls 41b and 41c, and a front wall 41d, which walls are integral with the body 36. Each of the side walls 41b and 41c has a hook 42, like the aforementioned battery mount portion 4. The hook 42 has a hook surface 42a distanced from the bottom wall 41a. A corner portion defined by the bottom wall 41a and front wall 41d is provided with engaging holes 43, and an anti-removal projection 44 is integrally formed on a middle part of the bottom wall 41a. The projection 44 has an inclined top surface 44a extending upwardly from the rear to the front.

Since the battery mount portions 4 and 41 have the same shape, the computer-side battery 10 can be fitted to the mount portion 41 in the same manner in which the battery pack 10 is attached to the mount portion 4 of the housing 1.

As is shown in FIGS. 9 and 11, the front wall of the unit body 36, which faces the housing 1, has a laterally elongated insertion hole 45 extending almost over the entire width of the front wall. The insertion hole 45 is situated above the second connector 40. A pair of left and right terminal metal members 46a and 46b are arranged inside the insertion hole 45 and positioned within the body 36 above the printed wiring board 29. In this embodiment, the metal members 46a and 46b are supported on an upper portion of a support stay 47 extending upwards from the board 39. These members 46a and 46b are connected to the wiring pattern on the printed wiring board 39 through lead wires 48.

The front and rear portions of each metal member 46a, 46b are bent upwards and downwards, respectively, thereby constituting first and second power-receiving terminals 49a and 49b. The first terminals 49a are exposed outside through the insertion hole 45 of the unit body 36 and arranged adjacent to each other on the right side of the insertion hole 45, when viewed from the front of the body 36.

Each of the second power-receiving terminals 49b is exposed to the mount portion 41 through a through-hole 50 formed in the front wall 41d of the mount portion 41. Like the terminals 7a in the battery mount portion 4, the terminals 49b are spaced to each other in the lateral direction of the mount portion 41. As shown in FIG. 8, the right terminal metal member 46b is bent like a crank.

As is shown in FIGS. 8 through 10, a unit-side battery pack 55 is removably attached to the battery mount portion 41 of the unit body 36 from the rear of the body 36. The battery pack 55 is rechargeable and functions as a power source for the personal computer and HDD 38. In the state wherein the battery pack 55 is attached to the battery mount portion 41, the upper and rear surfaces of the battery pack 55 are exposed to the outside so as to be flush with the upper and rear surfaces of the body 36, thus constituting part of the outer surface of the body 36.

The battery pack 55 has almost the same structure and dimensions as the computer-side battery pack 10. The battery packs 55 and 10 are mutually compatible. Specifically, the battery pack 55 has a rectangular-parallelepipedic shape. The right and left side surfaces of the battery pack 55 have guide projections 56 which are removably engaged with the hooks 42 when the pack 55 is inserted into the mount portion 41. The front wall of the battery pack 55 has engaging projections 57 removably engageable with the engaging holes 43.

The battery pack 55, however, differs in structure from the battery pack 10 in the following respects. A terminal support 58 projects rearward the rear surface of the battery pack 55. The terminal support 58 extends almost over the entire width of the battery pack. The bottom surface of the support 58 and the front and bottom surfaces of the battery pack 55 have pairs of right and left terminal windows 60, respectively. A pair of terminal metal members 59, which are electrically connected to batteries (not shown), are provided within the battery pack 55. Each terminal metal member 59 constitutes a first power-supply terminal 59a exposed to the terminal window in the bottom surface of battery pack 55, a second power-supply terminal 59b exposed to the terminal window in the bottom surface of the support 58, and a third power-supply terminal 59c exposed to the terminal window in the front surface of battery pack 55. When the support 58 is viewed from the rear side, the second power-supply terminals 59b are arranged adjacent to each other on the left side of the support 58, as shown in FIG. 8. The distance between the terminals 59c corresponds to that between the first power-receiving terminals 49a. By contrast, the first terminals 59a exposed to the front face of the pack 55 and the third terminals 59c exposed to the bottom surface of the pack 55 are distanced in the lateral direction of the pack 55, respectively. The distance between the terminals 59a or 59c corresponds to that between the power-receiving terminals 7a or 49b in the mount units 4 and 41.

Accordingly, when the unit-side battery pack 55 is mounted in the battery mount portion 4 of the housing 1, the first power-supply terminals 59a (on the bottom side) contact the power-supply terminals 7a, the support 58 projects from the rear surface of the housing 1, and the second power-supply terminals 59b on the bottom of support 58 are exposed. On the other hand, when the computer-side battery pack 10 is mounted in the battery mount portion 41 of the unit 35, the second power-supply terminals 13b of the pack 10 contact the second power-receiving terminals 49b in the mount portion 41.

A fixing mechanism 61 for ensuring the fixation of the unit-side battery pack 55 in the battery mount portion 41 or 4 is provided at a middle part of the pack 55. The fixing mechanism 61 has the same structure as the fixing mechanism 15 of the battery pack 10; therefore, the parts common to those of the mechanism 15 are denoted by the same reference numerals and description thereof will be omitted.

Figure 12:
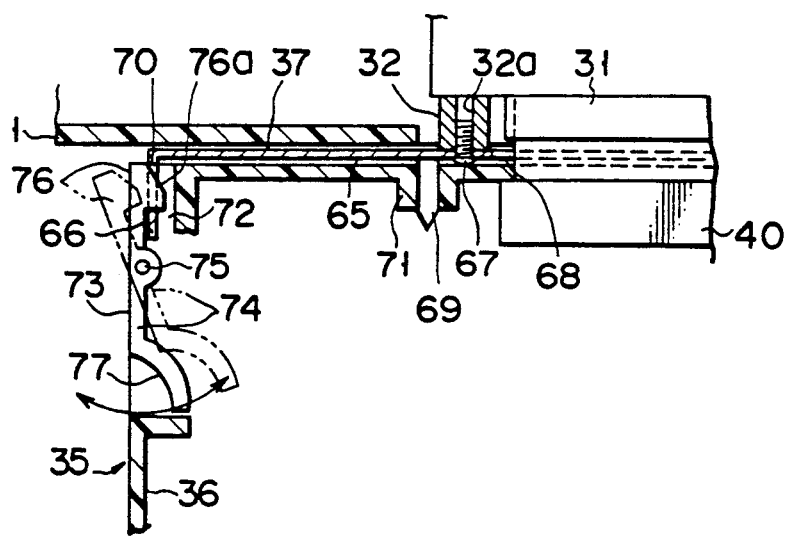

The bracket 37 by which the unit body 36 is coupled to the housing 1 is attached to the housing 1, as shown in FIGS. 8 and 12. In this embodiment, after removing the cap covering the opening 30, the bracket 37 is attached to the housing 1 by using the heads 32 of the bolts situated within the opening 30.

The bracket 37 comprises an elongated fixing plate 65 and hooks 66 formed by bending rearwards both end portions of the fixing plate 65. The plate 65 is fastened to the heads 32 of the bolts by means of screws 67 screwed into threaded screw holes 32a in the heads 32.

The fixing plate 65 is attached so as to cover the opening 30, and the entire length of the plate 65 is substantially the same as the width of the unit body 36. The fixing plate 65 has an opening 68 for exposing the first connector 31 and also has a pair of positioning pins 69 projecting rearwards from both side portions of the exposure opening 68. Each hook 66 has a hook hole 70.

As is shown in FIGS. 11 and 12, the front wall of the unit body 36 has guide holes 71 in which the positioning pins 69 are adapted to be removably inserted, and a pair of insertion holes 72 in which the hooks 66 of the bracket 37 are removably fitted. A latch 73 is provided at the front end portion of each of the side walls of the body 36 and situated adjacent to the insertion hole 72. Each latch 73 has a latch portion 74 extending horizontally along the side of the body 36. An intermediate portion of each latch portion 74 is supported on the body 36 so as to be rotatable about a shaft 75. On the front end portion of the latch portion 74 is formed a claw 76 which removably engages, from the outside, the hook hole 70 of the bracket 37. A front side surface of the claw 76, which faces the insertion hole 72, is chamfered into an inwardly inclined surface 76a. Each latch portion 74 is always urged by a spring (not shown) in such a direction that the claw 76 hooks in the hook hole 70.

In this embodiment, the latches 73 and bracket 37 constitute coupling means for coupling the drive unit 35 to the housing 1.

A rear end portion of each latch portion 74 has a finger hook 77 which is recessed towards the body 36. When the finger hook 77 is pressed inwards, the latch portion 74 is rotated so that the claw 76 is disengaged from the hook hole 70.

Figure 13:
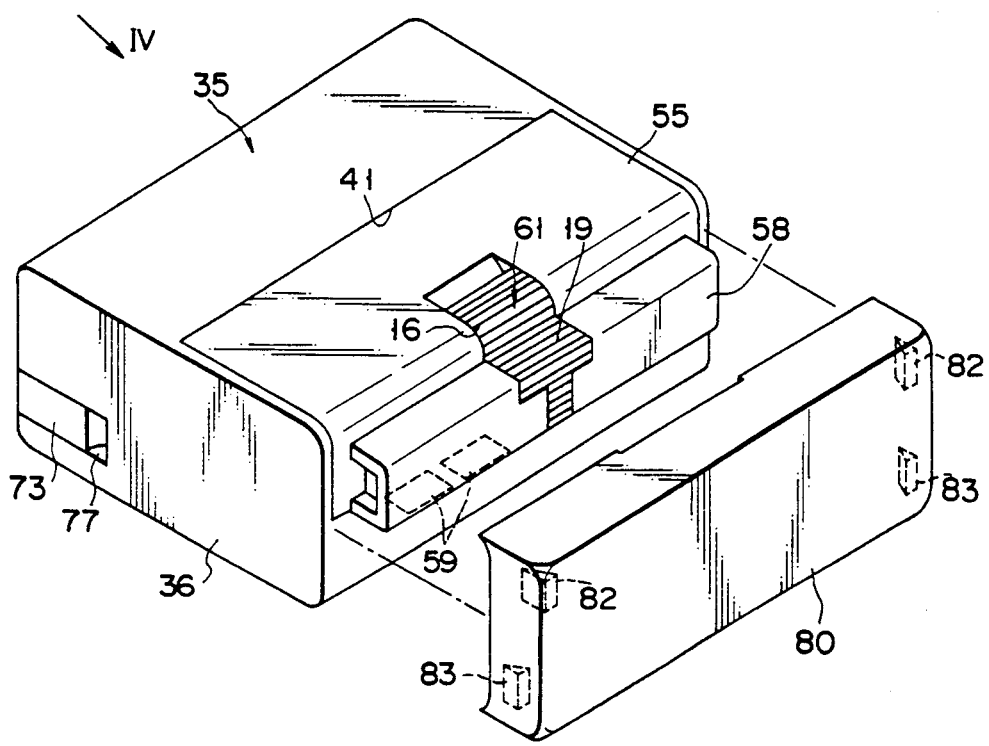

Whether the unit-side battery pack 55 is mounted in the computer-side battery mount portion 4 or in the battery mount portion 41 of the unit body 36, the support 58 projects rearwards from the rear surface of the housing 1 or body 36, as shown in FIGS. 9 and 13. Thus, when the personal computer or drive unit 35 is not used, the support 58 is covered by a protection cover 80 made of synthetic resin. The protection cover 80 has a rectangular box-like shape, and the front face thereof is opened. The cover 80 is provided on the inner surfaces of its side walls with first projections 82 removably engaged with recesses 81 formed in both end faces of the support 58, and with second projections 83 removably engaged with the hook holes 70 of the bracket 37.

When the HDD unit 35 will be connected to the computer, first, the cap is removed from the rear surface of the housing 1, and the bracket 37 is fixed to the rear surface of the housing 1 by using the heads 32 of the bolts for securing the first connector 31. Then, pressing the operation levers 16 of the battery packs 10 and 55 rearwards by the finger, the fixation of the battery packs 10 and 55 is released. In this state, the packs 10 and 55 are moved rearwards and removed from the battery mount portions 4 and 41, respectively.

The unit-side battery pack 55, which has been removed, is fitted from the rear side into the battery mount portion 4 of the housing 1 in the same manner in which the battery pack 10 is mounted. As is shown in FIG. 9, the first power-supply terminals 59a exposed to the bottom surface of the battery pack 55 are brought into contact with the power-receiving terminals 7a exposed to the mount portion 4, whereby the battery pack 55 and the electronic circuit within the housing 1 are electrically connected with each other.

Thereafter, the unit body 36 is aligned with the bracket 37 attached to the housing 1, from the rear side of body 36, and is pushed toward the housing 1.

Upon pushing the unit body 36, the positioning pins 69 of the bracket 37 are fitted into the guide holes 71 of the unit body 36, and thus, the body 36 and the housing 1 are mutually aligned with each other and the first and second connectors 31 and 40 are connected to each other. Simultaneously, the support 58 of battery pack 55 is put into the insertion hole 45 of the unit body 36, and the second power-supply terminals 59b situated at the bottom of the support 58 are brought into contact with the first power-receiving terminals 49a in the body 36. Thus, the battery pack 55 is electrically connected to the HDD in the body 36.

Upon the pushing the unit body 36, the hooks 66 of the bracket 3 enter the insertion holes 72 of the body 36, contact the claws 76 at the front ends the of corresponding latch portions 74, and slide over the inclined surfaces 76a of the claws 76. Thus, as is shown by two-dot and dash line in each FIG. 12, each latch portion 74 rotates in such a direction that the claw 76 is away from the hook 66 towards the outside. When the hooks 66 of the bracket 37 are completely inserted in the insertion holes 72, the claws 76 engage the hook holes 70 and the latch portions 74 are automatically restored to the original position by the force of the springs. Thus, the claws 76 of the latch portions 74 are hooked in the hook holes 70, and the unit body 36 is securely fixed to the bracket 37. In this way, the unit body 36 is electrically and mechanically connected to the housing 1.

According to the present embodiment, as shown in FIGS. 9 and 10, the computer-side battery pack 10 removed from the battery mount portion 4 is inserted in the battery mount portion 41 of the unit body 36 from the rear side thereof. The pack 10 is mounted in the mount portion 41 in the same manner in which it is mounted to the mount portion 4. The second power-supply terminals 13b provided on the front of the battery pack 10 contact the second power-receiving terminals 49b exposed to the battery mount portion 41 and thus the battery pack 10 is electrically connected to the HDD 38 and the electronic circuit of the computer.

As has been described above, according to this embodiment, while the unit-side battery pack 55, in place of the battery pack 10, is fitted to the battery mount portion 4 of the housing 1, the unit body 36 is coupled to the housing 1, whereby the battery pack 55 is electrically connected both to the electronic circuit of the computer and the HDD 38 through the terminal metal members 7, 46a and 46b. Thus, both the electronic circuit and HDD 38 can be driven by the single battery pack 55.

Since the drive power source can be used commonly by the personal computer and the expansion device 35, an exclusive power source for driving the expansion device 35 can be dispensed with. Therefore, the size of the personal computer, including attached accessories, can be reduced, compared to conventional apparatuses, and the portability of the computer is enhanced.

In addition, according to this embodiment, the computer-side battery pack 10 which is designed as a power source of the personal computer can be mounted in the battery mount portion 41 of the unit body 36, in place of the unit-side battery pack 55. This battery pack 10 can be connected to the HDD 38 and computer through the terminal metal members 46a and 46b. Accordingly, the HDD 38 can be supplied with power from both the unit-side and computer-side battery packs 55 and 10. Even if the HDD 38 which consumes relatively high power is connected to the computer, the power consumption of the battery packs 10 and 55 can be limited to a low level and the operating time of the personal computer can be increased.

The present invention is not limited to the above embodiment. As is shown in FIG. 15, only the unit-side battery pack 55 may be used to drive the electronic circuit of the computer and the HDD 38. In this case, since there is no need to obtain electric power from the battery pack 10 mounted to the battery mount portion 41 of the unit body 36, it is sufficient that the mount portion 4 has only the function of holding the battery pack 10 or 55. Consequently, the second power-receiving terminals of the unit body 36 can be omitted.

FIGS. 16 through 29 show a hard-disc drive (HDD) unit according to a second embodiment of the invention. The second embodiment differs from the first embodiment mainly with respect to the structure of the coupling means for coupling the unit body 36 to the housing 1 of the computer. In the second embodiment, the structural elements already mentioned in connection with the first embodiment are denoted by like reference numerals, and the detailed description thereof will be omitted.

As is shown in FIGS. 16, 17, 18 and 27, the HDD unit 35 comprises a rectangular-parallelepipedic unit body 36 having a battery mount portion 41 at its upper rear part, and a unit-side battery pack 55 removably mounted in the mount portion 41. The battery pack 55 has substantially the same structure a the computer-side battery pack 10, and the packs 55 and 10 are mutually compatible. Specifically, the battery pack 55 has a rectangular-parallelepipedic shape, and the right and left side walls of the pack 55 have guide projections 56 which are removably engageable with the hooks 42 when the pack 55 is fitted in the battery mount portion 41. The front wall of battery pack 55 has engaging projections 57 which are removably engageable with the engaging holes 43.

The battery pack 55 differs in structure from the battery pack 10 in the following respects. The battery pack 55 has a coupling portion 84 projecting rearwards beyond the guide projections 56, so that the pack 55 has a rectangular-parallelepipedic shape, with a depth L1 greater than a depth L2 of the pack 10. Thus, when the battery pack 55 is mounted in the mount portion 4 or 41, the coupling portion 84 projects rearwards from the housing 1 or unit body 36. On both side faces of the coupling portion 84 are formed engaging grooves 85 extending perpendicularly to the upper and lower surfaces of the pack 55. The grooves 85 are situated adjacent to the corresponding guide projections 56. Each engaging groove 85 is open to the side and lower surfaces of the battery pack 55. A pair of terminal windows 60 are formed in the rear surface of the coupling portion 84, and second power supply terminals 59b of the pack 55 are exposed outward through the terminal windows 60. In addition, on the rear surface of the pack 55 is formed an engaging recess 86 extending in the width direction of the pack 55 and situated between the terminals 59b.

At the center part of the battery pack 55 is provided fixing a mechanism 61 for maintaining the fixed state of the battery pack into the battery mount portion 4 or 41. The structure of the fixing mechanism 61 is basically identical to that of the fixing mechanism 61 of the computer-side battery pack 10. As shown in FIGS. 16 to 22, the fixing mechanism 61 comprises an operation lever 21, and a torsion coil spring 92 for urging the operation lever 21 downwards in a rotational manner, which are built in a rectangular casing 55a of the battery pack 55.

The operation lever 21 extends along a line connecting the front and rear of the casing 55a. The operation lever 21 is stored in a groove 23 opening to the bottom of the casing 55a. The entire body of the operation lever 21 is exposed to the bottom of the casing 55a. A cylindrical boss 116 is formed at one end of the lever 21 and a pair of shafts 18, projecting from both side faces of the boss 116, are rotatably supported by the casing 55a. The other end of the operation lever 21 abuts on the inner face of the bottom wall of the casing 55a. On the lower surface of the operation lever 21 is formed a claw 22 engageable with the anti-removal projection 9 of the computer-side battery mount portion 4 and the anti-removal projection 44 of the unit-side battery mount portion 41. The torsion coil spring 92 is interposed between the upper surface of the operation lever 21 and a top plate 55b of the casing 55a. The upper surface of the lever 21 has a seat portion 97 to be engaged with an arm portion 92a of the spring 92.

Thus, the operation lever 21 is urged downwards (in FIG. 20), with the shafts 18 employed as a fulcrum, and the claw 22 projects into the groove 23.

When the battery pack 55 having the above fixing mechanism 61 is mounted in the unit-side battery mount portion 41, the claw 22 of the operation lever 21 moves over the anti-removal projection 44, and the lever 21 is rotated upwards against the urging force of the torsion coil spring 92. Once the battery pack 55 is completely inserted in the battery mount portion 41, the claw 22 moves beyond the anti-removal projection 44. The operation lever 21 is rotated downwards by the spring 92 and the claw 22 is engaged with the projection 44. Thus, the battery pack 55 is fixed in the mount portion 41.

Similarly, when the unit-side battery pack 55 is inserted in the mount portion 4 of the computer, the battery pack 55 is fixed by means of the operation lever 21, in the same manner in which the pack 55 is mounted in the mount portion 41.

In the casing 55a of the battery pack 55 is arranged a locking mechanism 100 for forcibly rotating the operation lever 21 upwards, that is, in such a direction as to disengage the lever 21 from the projection 9 or 44 and for holding the lever 21 in the rotated position. As is shown in FIGS. 18 to 22, the locking mechanism 100 has a slider 101 movable in a direction perpendicular to the operation lever 21, that is, in the width direction the casing 55a. An elongated guide groove 102 extending in the width direction of the casing 55a is formed in the bottom surface of the casing 55a. The groove 102 defines the direction of movement of the slider 101. An end portion of the groove 23 communicates with an intermediate portion of the groove 102. A slide tab 117 is coupled to the slider 101. The slide tab 117 has an elongated plate-like shape, and is slidably engaged in a slide groove 104 formed in the upper surface of the cover plate 55b and located at the coupling portion 84. Three retaining projections 105 project from the lower surface of the slide tab 117. The retaining projections 105 pass through a throughhole 106 formed in the bottom surface of the slide groove 104 and are hooked in an engaging hole 107 in the upper wall of the slider 101, thereby coupling the slide tab 117 and the slider 101. By sliding the slide tab 117 from the outside of the casing 55a, the slider 101 is moved in a direction perpendicular to the operation lever 21.

A cam groove 110 is formed in that side portion of the slider 101, which faces the operation lever 21. An engaging shaft 108 projecting from one end of the operation lever 21 is inserted in the cam groove 110. As is shown in FIGS. 21 to 24, the cam groove 110 extends in the direction of movement of the slider 101. The engaging shaft 108 is put in slidable contact with the upper surface of the cam groove 110. The upper surface of the cam groove 110 includes an inclined surface 111 extending downwards in the direction of movement of the slider 101. By virtue of the presence of the inclined surface 111, the upper surface of the groove 110 forms a cam surface 112 having a crank-like shape. Specifically, the cam surface 112 has an upper-side first cam surface 112a and a lower-side second cam surface 112b. The second cam surface 112b is lower than the upper edge of the engaging shaft 108 of the operation lever 21 while the lever is horizontally situated.

As is shown in FIGS. 20 and 21, when the slider 101 is moved to the rightmost position, the engaging shaft 108 of the operation lever 21 is put in contact with the first cam surface 112a and the operation lever 21 is urged downwards by the torsion coil spring 92. Thus, the operation lever 21 is held in the locked position (shown in the figures). On the other hand, when the slider 101 is moved to the left, as shown in FIGS. 23 and 24, the second cam surface 112b moves onto the engaging shaft 108 and presses the shaft downwards. Consequently, as is shown in FIG. 23, the operation lever 21 is rotated upwards (in a direction away from the anti-removal projection 9 or 44) against the urging force of the spring 192, about the shafts 18. Thus, the lever 21 is located at its released position. In the locked state of the operation lever 21, the slider 101 is situated to the rightmost position (lock position), and on the other hand, in the released state of the lever 21, the slider 101 is moved to the left (release position). The slide tab 117 is provided with a mark 113 indicative of the position of the slider 101. The top plate 55b is provided with a lock mark 114 and a release mark 115 (see FIG. 18) which are adjacent to the edge of the slide groove 104. The lock mark 114 indicates that the slider 101 is in the locked state when the mark 113 is met. The release mark 115 indicates that the slider 101 is in the released position when the mark 113 is met.

A recess 120 is formed in the side surface of the slider 101, adjacent to the cam groove 110. The recess 120 is covered by a cover plate 121 which is fixed to the casing 55a. The slider 101 is movable relative to the cover plate 121.

A spring receiving projection 122 is formed at one end of the cover plate 121 and located in the recess 120. A compression coil spring 123 is interposed between the spring receiving projection 122 and the inner surface of the recess 120, while the spring 123 is compressed in the direction of movement of the slider 101. Thus, the slider 101 is normally urged and held in the lock position (FIG. 21) by means of the spring 123.

A projection 125 extends in the direction of movement of the slider 101 from one end of the slider 101. The projection 125 extends toward the release position of the slider 101. Engaging claws 126 extend upwards and downwards from the distal end of the projection 125.

A latch device 130, serving as means for holding the slider 101 at the release position, is provided on one side of the slider 101 in the direction of movement. The latch device 130 has a latch box 131 of synthetic resin, which faces the slider 101. The latch box 131 is interposed between the bottom surface of the guide groove 102 and the top plate 55b. The latch box 131 has an opening 132 at one end which faces the slider 101. The projection 125 of the slider 101 is removably inserted into the opening 132.

A clamp member 133 of synthetic resin is housed in the latch box 131 to be slidable in the direction of movement of the slider 101. A guide projection 134 is formed on the side face of the clamp member 133 and slidably fitted in a guide groove 135 in the side wall of the latch box 131. A compression coil spring 136 (see FIG. 25A) is provided between the clamp member 133 and the latch box 131 so as to constantly urge the clamp member 133 towards the opening 132 of the latch box 131. Consequently, the guide projection 134 abuts against one end of the guide groove 135, and the clamp member 133 is held in the latch box 131 without slipping out of the box.

In this state, one end face of the clamp member 133 projects slightly from the opening 132. This one end face abuts on the distal end of the projection 125 of the slider 101. The one end face of the clamp member 133 is provided integrally with clamp arms 138 for clamping the projection 125 vertically. The portions of the clamp arms 138, which are connected to the clamp member 133, are made thin, such that the the arms 138 are rotatable relative to the clamp member 133. The clamp arms 138 extend upwards and downwards so as to be away from each other from the opening 132. The end portion of each clamp arm 138 has an engaging portion 139 which is adapted to be engaged with the engaging claw 126 of the projection 125.

When the slider 101 is moved towards the release position the clamp member 133 is pushed into the latch box 131 by means of the projection 125. Thus, the clamp arms 138 are put in contact with the upper and lower edges of the opening 132 and rotated in such a direction as to approach each other. Then, the arms 138, along with the projection 125 of the slider 101, is pushed into the latch box 131. Consequently, the engaging portions 139 of the clamp arms 138 are hooked on the engaging claws 126 of the projection 125. Thus, the slider 101 and clamp member 133 are coupled with each other (see FIG. 25B).

As is shown in FIG. 25A, a latch member 140 is rotatably supported on the side surface of the clamp member 133. The latch member 140 has V-shaped notches 141 at both ends thereof between which a rotational center of the member is situated. A positioning projection 142 to be contacted with the latch member 140 is formed on the inner face of the latch box 131. The positioning projection 142 is situated above the terminal end of the guide groove 135. By virtue of slidable contact between the positioning projection 142 and latch member 140, the latch member 140 is held almost horizontally, with the notches 141 being directed horizontally. The inner surface of the terminal end of the latch box 131 has a guide projection 143 which contacts one end of the latch member 140 when the clamp member 133 is pushed into the latch box 131 to the limit. That surface of the guide projection 143, which contacts the latch member 140, forms a cam surface 144 inclined downwards.

When the clamp member 133 is pushed in and one end of the latch member 140 contacts the cam surface 144, the latch member 140 is rotated by the cam surface 144 in the counterclockwise direction indicated by an arrow in FIG. 25B at a predetermined angle, and the other end of the latch member 140 is moved to the left side of the positioning projection 142.

When the pushing of the clamp member 133 is released in this state, the clamp member 133 is pushed back to the opening (132) side by the compression coil spring 136. Consequently, as is shown in FIG. 25C, the notch 141 at the other end of the latch member 140 is hooked on the corner of the positioning projection 142, and the clamp member 133 is held in the state wherein it is pushed in the latch box 131. As a result, the engaging portions 139 of the clamp arms 138 remain hooked on the engaging claws 126 of the projection 125, and the slider 101 is held in the release position.

When the slider 101, which is held in the release position, is further urged toward the releasing direction, thereby pushing the clamp member 133 into the latch box 131 to the limit, one end of the latch member 140 is brought into contact with the cam surface 144 once again. Thus, the latch member 140 is guided by the cam surface 144 and rotated counterclockwise, as shown in FIG. 25C by a broken line. If pushing of the clamp member 133 is released in this state, the clamp member 133 is pushed back to the opening (132) side by means of the compression coil spring 136. Then, the latch member 140 is put in contact with the positioning projection 142 and is rotated to the horizontal state. In addition, the clamp arms 138 project from the opening 132 and are disengaged from the projection 125 of the slider 101. Accordingly, the slider 101 is forcibly returned to its rocked position by the spring 123.

Figure 16:
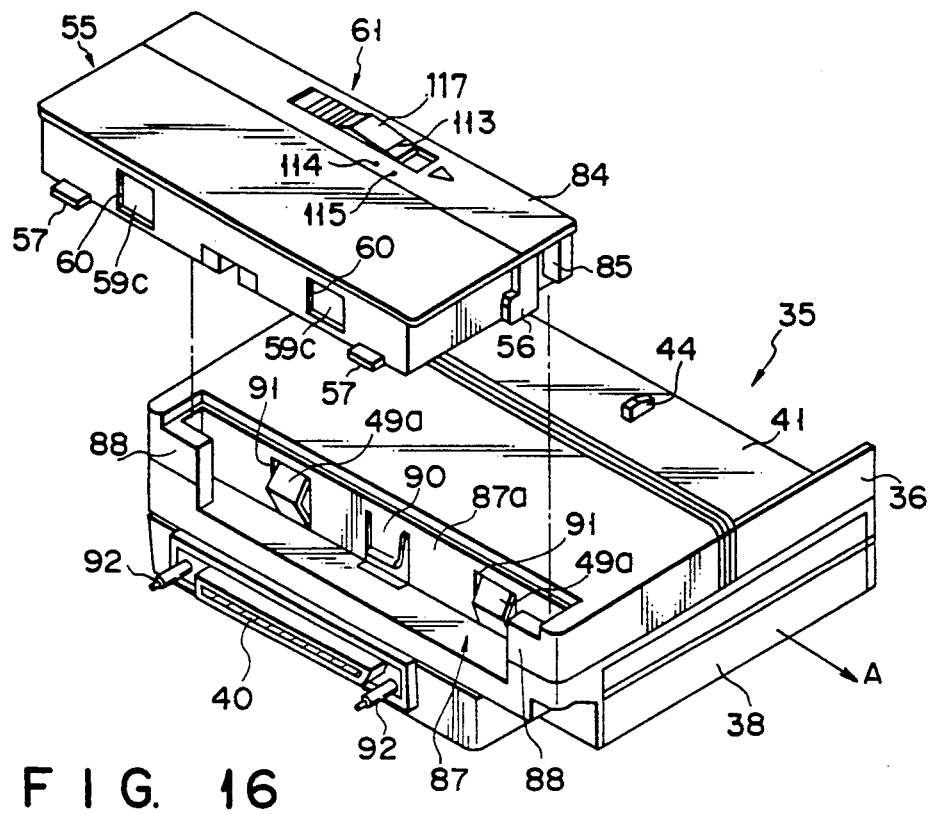
Figure 17:
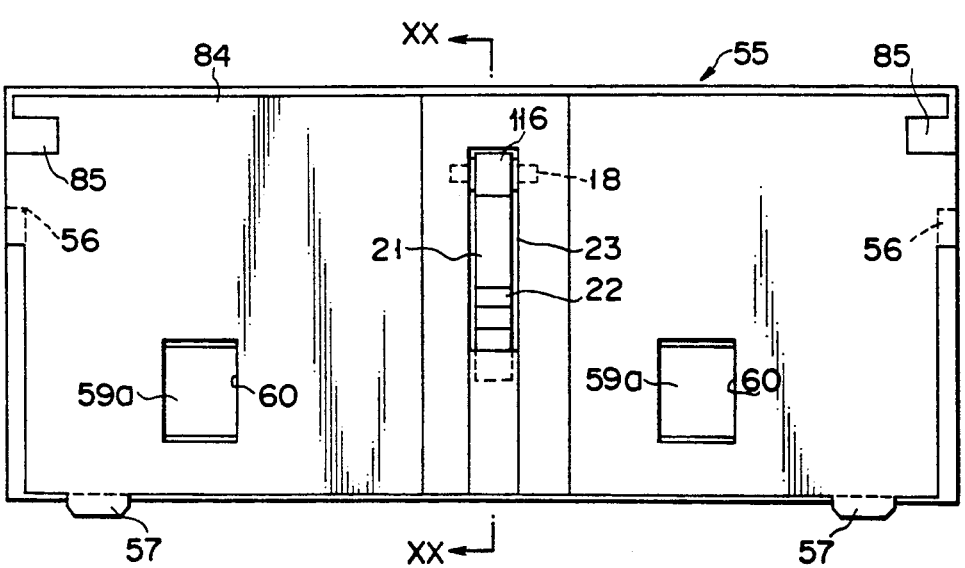
Figure 22:
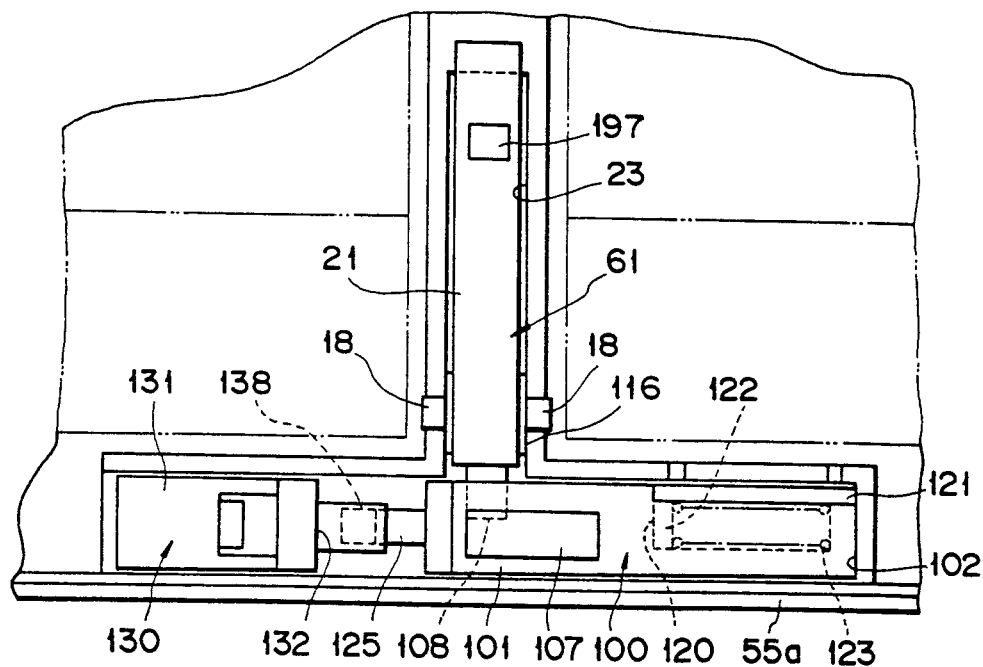

As shown in FIG. 16, the front portion of the unit body 36 has an fitting recess 87 in which the coupling portion 85 of the battery pack 55 can be removably fitted. The recess 87 is defined by a rear wall 87a, right and left side walls and a bottom wall, which walls are integral with the unit body 36. The recess 87 has a rectangular-parallelepipedic shape, with substantially the same dimensions as the coupling portion 84. The recess 87 is open to the upper and front surfaces of the unit body 36. Front end portions of the right and left side walls of the unit body 36 have engaging projections 88 projecting into the recess 87. Each projection 88 faces the rear wall 87a with a predetermined distance and can be fitted into the corresponding engaging groove 85 of the coupling portion 84.

An elastically deformable engaging claw 90 is formed at the middle part of the rear wall 87a defining the recess 87. The rear wall 87a has a pair of rectangular through-holes 91 situated on both sides of the engaging claw 90. A pair of left and right first power-receiving terminals 49a are arranged within the unit body 36, and project into the fitting recess 87 through the corresponding through-holes 91, respectively.

Figure 27:
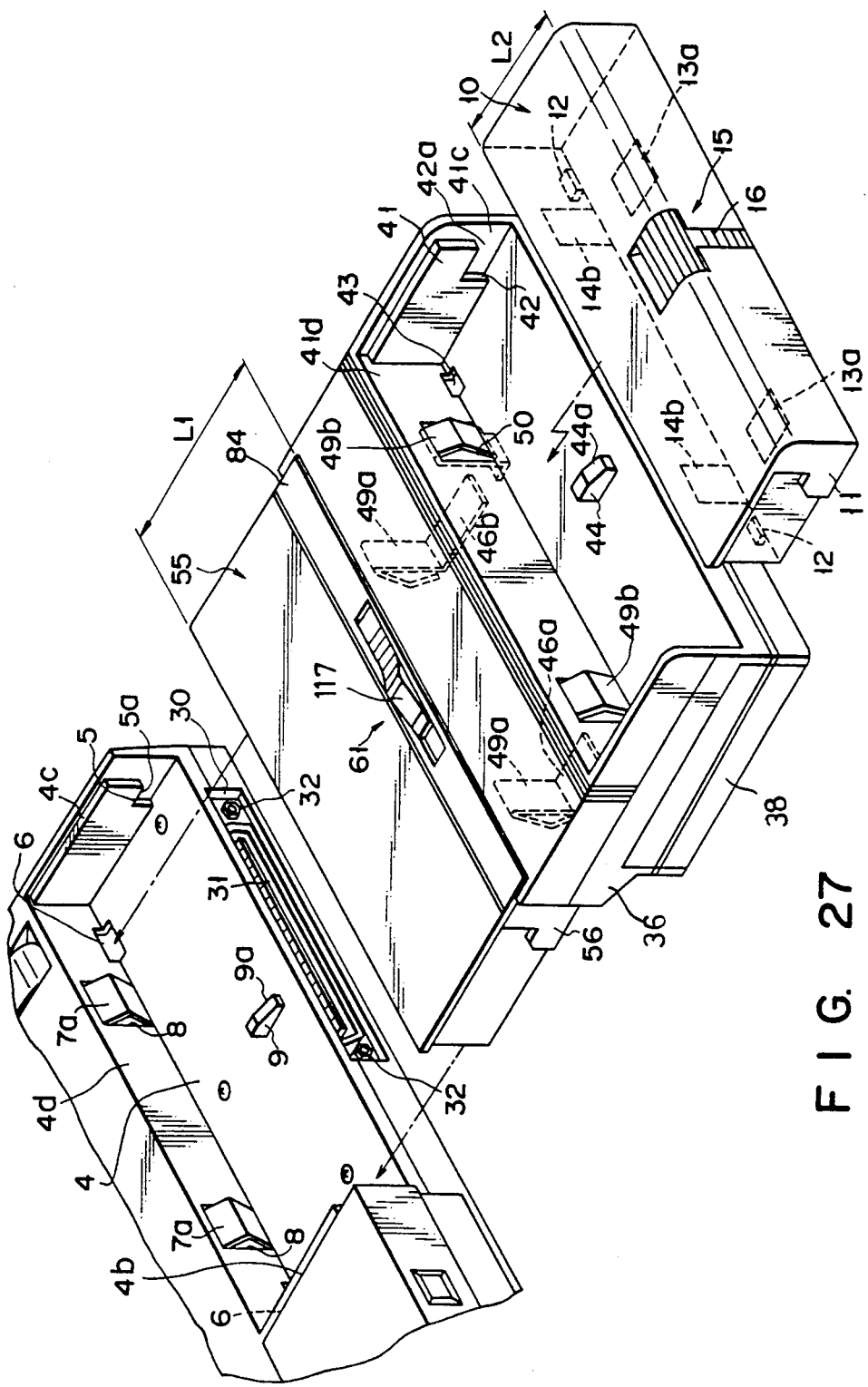
Figure 28:
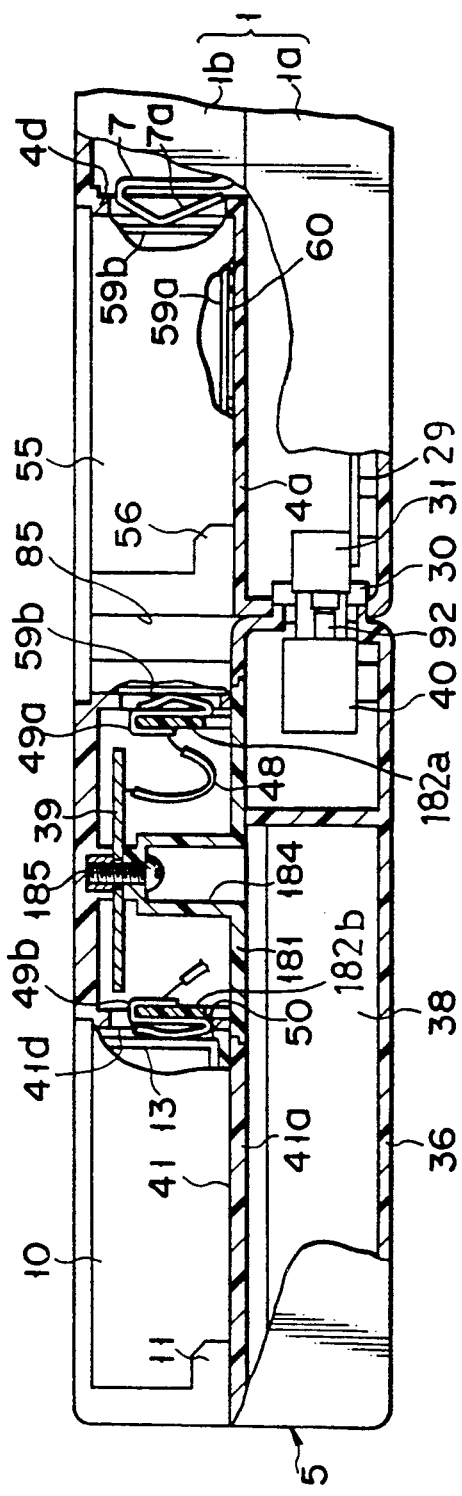

As shown in FIGS. 16 and 28, the unit body 36 contains a second connector 40 which is mounted on the bottom wall of the unit body 36 and projects from the front wall of the unit body. The second connector 40 is situated below the fitting recess 87 and is displaced to the left, when viewed from the front of the unit body 36. A pair of guide pins 9 project forwards from the front wall of the unit body 36, and are situated on both sides of the second connector 40. The pins 92 are positioned to be engageable with the threaded holes of heads (see FIG. 27) of a pair of bolts fastening the first connector 31 of the computer 1. The guide pins 92 are urged forwards by springs (not shown) and can be pushed into the inside of the unit body 36 against the urging force of the springs.

As is shown in FIG. 27, a pair of through-holes 50 are formed in the front wall 41d of the unit-side battery mount portion 41. A pair of second power-receiving terminals 49b project into the mount portion 41 through the through-holes 50. The power-receiving terminals 49b are formed of terminal metal members which are independent of the power-receiving terminals 49a.

As is shown in FIG. 28, the first and second terminals 49a and 49b are arranged in the unit body 36 with being supported by a holder 181 of synthetic resin. The holder 181 has front and rear standing walls 182a and 182b overlapping the rear wall 87a and front wall 41d of the unit body 36. The first and second power-receiving terminals 49a and 49b are fitted on the front and rear standing walls 182a and 182b, respectively. The first terminals 49a are connected to HDD 38 and the second connector 40 through leads wires 48 and a printed wiring board 39.

The holder 181 is integrally provided with a hollow boss 184 extending upwards. The boss 184 is fastened to the upper wall of the unit body 36 by means of a screw 185. The printed wiring board 39 is interposed between the boss 184 and the inner surface of the upper wall. The printed wiring board 39 is fastened to the upper wall by means of the screw 185. Various electronic parts (not shown) are mounted on the board 39.

Figure 29:
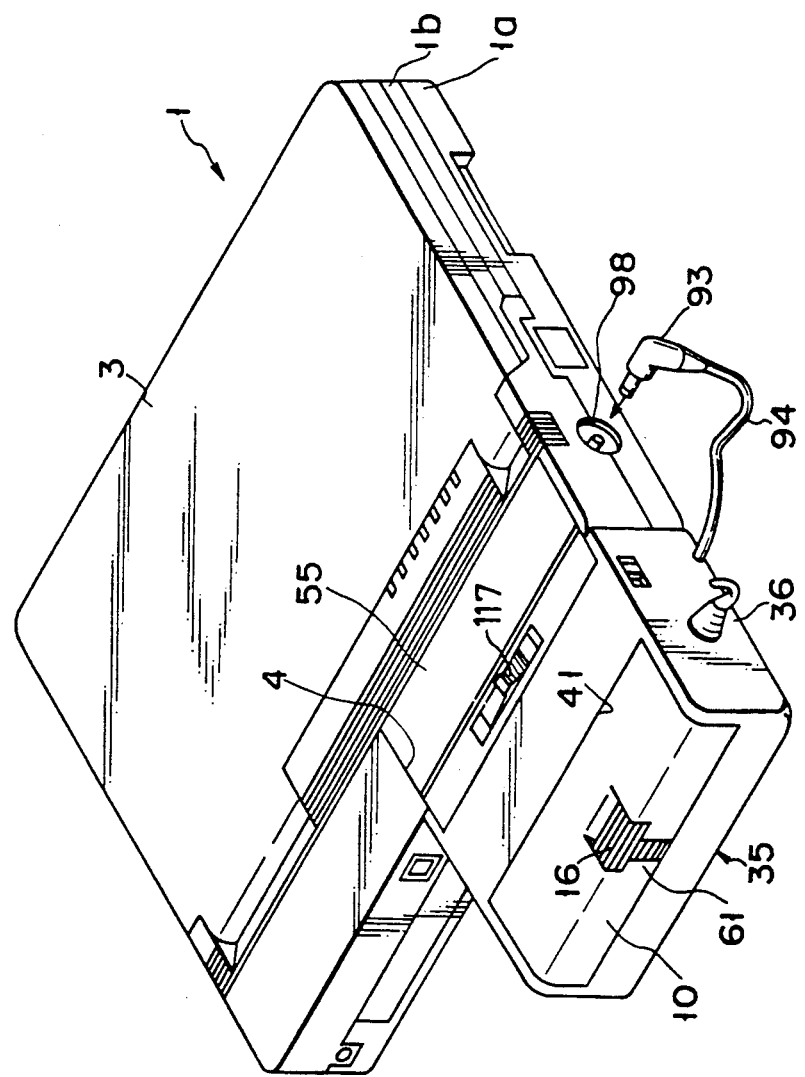

As is shown in FIGS. 26 and 29, the second power-receiving terminals 49*b* are connected to a power cord 94 having at its distal end a power-supply plug 93 which is adapted to be fitted in a DC power socket 98 (see FIG. 29) of the computer 1. The power cord 94 extends outwards from one side of the unit body 36. A guide groove 96, in which the power cord 94 is engageable, is formed in the bottom surface of the unit 36. As shown in FIG. 26, the guide groove 96 comprises an L-shaped first portion 96*a*, extending from the left side from which the cord 94 extends, a second portion 96*b* extending from the end of the first portion to the left side, and a third portion 96*c* extending from the end of the first portion 96*a* to the right side of the body. The proximal end portion of the power cord 94 is fitted in the first portion 96*a* and either the second or third portion 96*b*, 96*c* so that the distal end portion of the cord 94 is led out from one of the side surfaces of the unit body 36. Either second or third portion 96*b* or 96*c* is selected in accordance with the position of the power socket 98 provided on the computer 1. For example, in the case where the unit body 36 is connected to the computer 1 and the power socket 98 is positioned on the right side of the body, as shown in FIG. 29, the power cord 94 is fitted in the first and second portions 96*a* and 96*b* of the guide groove 96, and is led out from the right side of the body. On the other hand, where the power socket is positioned on the left side of the unit body 36, the power cord 94 is fitted in the first and third portions 96*a* and 96*c* of the guide groove 96 and is led out from the left side of the body. In accordance with the position of the power socket, the power cord 94 can be led out from either side of the unit body 94. In addition, the excessive portion of the power cord 94 can be stored in the bottom of the unit body 36. In FIG. 26, reference numeral 97 denotes a projection for preventing removal of the cord 94 from the guide groove 96.

The HDD 38 can be drawn out in the direction of arrow A from the unit body 36, as shown in FIGS. 16 and 26.

In the second embodiment, as shown in FIGS. 27 and 28, a pair of power-receiving terminals 7*a* arranged in the housing 1 of the computer are exposed to the computer-side battery mount portion 4 through a pair of through-holes 8 formed in the front wall 4*d*.

The HDD unit 35 having the above structure is connected to the computer in the following manner.

First, the battery packs 10 and 55 are removed from the computer and the unit body 36, respectively. As is shown in FIGS. 16 and 27, the coupling portion 84 of the removed battery pack 55 is fitted, from the above, in the fitting recess 87 of the unit body 36. Thus, the battery pack 55 is coupled to the front portion of the unit body 36. Upon fitting the coupling portion 84 in the fitting recess 87 from the above, the engaging projections 88 are engaged in the engaging grooves 85 of the coupling portion 84. At this time, the engaging claw 90 of the unit body 36 engages the engaging recess 86 of the battery pack 55, thereby preventing the removal of the coupling portion upwards from the recess 87. Simultaneously, the second power-supply terminals 59*b* of the battery pack 55 are brought into contact with the first power-receiving terminals 49*a* of the unit body 36, whereby the battery pack 55 and HDD 38 are electrically connected to each other. In the coupled state, the upper surface of the battery pack 55 is flush with the upper surface of the unit body 36.

While the end portion of the battery pack 55 is aligned with the computer-side battery mount portion 4, the combination of the battery pack 55 and the unit body 36 is pushed toward the housing 1 of the computer. Thus, the battery pack 55 is fitted to the mount portion 4 and is held therein by the fixing mechanism 61. As is shown in FIG. 28, the third power-supply terminals 59*c* exposed to the front wall of the battery pack 55 contact the power-receiving terminals 7*a* exposed to the mount portion 4. Thus, the battery pack 55 is electrically connected to the electronic circuit 29 within the housing 1.

In addition, in the above-mentioned pushing operation, while being roughly guided by the engagement between the side walls of the battery pack 55 and the side walls 41*c* of the mount portion 4, the second connector 40 of the unit body 36 is led to the vicinity of the first connector 31 of the housing 1. When the unit body 36 is further pushed, the end portions of paired guide pins 92 are engaged in the threaded holes of the heads 32 of the nuts situated on the connector (31) side, so that the second connector 40 is mutually aligned with the first connector 31. Then, the second connector 40 and first connector 31 are mated and coupled with each other. As a result, the printed wiring board 29 in the housing 1 is electrically connected to the HDD 38.

By the above-described operation, the HDD unit 35 is electrically and mechanically connected to the housing 1.

In this embodiment, as shown in FIGS. 27 through 29, the computer-side battery pack 10 removed from the mount portion 4 is fitted in the mount portion 41 of the unit body 36 from the rear side thereof. The second power-supply terminals 13*b* provided on the front surface of the battery pack 10 contact the second power-receiving terminals 49*b* exposed to the battery mount portion 41. The power plug 93 of the power cord 94 connected to the second power-supply terminals 49*b* is connected to the power socket 98 of the computer. Thus, the battery pack 10 is electrically connected to the electronic circuit 29 in the housing 1 and also to the HDD 38 via the electronic circuit and battery pack 55.

When the HDD unit 35 is not used, the second connector 40 and fitting recess 87 is covered by a protection cover (not shown). The power cord 94, along with the power plug 93, is stored inside the protection cover.

According to the second embodiment having the above structure, the battery pack 55 is coupled to the front of the unit body 36 and is thereafter mounted to the mount portion 4 of the housing 1. Thus, the battery pack 55 is electrically connected to the electronic circuit of the computer and the HDD 38 through the power-receiving terminals 7*a*, 49*a* and 49*b*. Accordingly, like the first embodiment, both the electronic circuit and HDD 38 can be driven by the single battery pack 55. The size of the entire computer, including the HDD unit, can be reduced, and the portability can be enhanced.

Furthermore, according to this embodiment, the coupling portion 84 of the battery pack 55 is utilized to couple the pack 55 to the front of the unit body 36, and the battery pack 55 is mounted to the computer-side battery mount portion 4, thereby mechanically coupling the unit body 36 to the housing 1 of the computer. Thus, there is no need to use separate coupling means such as a bracket, screws, etc., so that the coupling and removal of the HDD unit 35 can be easily carried out, the number of parts can be reduced, and the structure of the entire computer can be simplified.

In order to remove the HDD unit 35 from computer, the user's hand is put on the upper surface of the unit-side battery pack 55 and the slide tab 117 is moved from the lock position to the release position by the fingertip. Subsequently, the slider 101 moves to the released position, and the engaging shaft 108 of the operation lever 21, which is put in the cam groove 110, is pushed downwards by the second cam surface 112b. Thus, the operation lever 21 is rotated upwards against the urging force of the torsion coil spring 192, and the claw 22 of the lever 21 is disengaged from the anti-removal projection 9.

When the slider 101 is moved to the release position in this manner, the projection 125 of the slider 101 enters the opening 132 in the latch box 131 and the clamp member 133 of the latch device 130 is pushed in the latch box 131. Consequently, the clamp arms 138 of the clamp member 133 are drawn into the opening 132 and are rotated so as to clamp the projection 125 vertically. Thus, the engaging portions 139 of the clamp arms 138 are hooked on the engaging claws 126 of the projection 125, and the slider 101 and clamp member 133 are coupled with each other.

When the clamp member 133 is pushed into the latch box 131 to the limit, the latch member 140 is guided by the clamp surface 144 of the guide projection 143 and is rotated counterclockwise at a predetermined angle. If the pushing of the slide tab 117 is released in this state, the clamp member 133 is pushed back toward the opening 132 by means of the compression coil spring 136 and the slider 101 is pushed toward the locked position by means of the compression coil spring 123. Thus, as shown in FIG. 25C, the notch 141 (at one end) of the latch member 140 is hooked on the corner of the positioning projection 142, and the clamp member 133 is locked.

By the locking, the clamp member 133 is held in the position where it is pushed in the latch box 131, and the slider 101, which is coupled with the clamp member 133 via the clamp arms 138, is held in its release position.

Thus, even if the hand is released from the slide tab 117, the operation lever 21 is held in the released position where the engaging claw 22 is disengaged from the anti-removal projection 9. Therefore, it is not necessary to do such a troublesome procedure in which the unit 35 is pulled out of the mount portion 4 while pushing the slide tab 117 in the release position.

Therefore, the unit 35 can easily be removed from the computer by one hand, and the operability is greatly improved.

The present invention is not limited to the above embodiments, and various changes and modifications can be made within the scope of this invention.

For example, the HDD was used as expanding means in the above embodiments; however, the HDD may be replaced with a printer, a memory, etc.

The expansion device relating to this invention can be applied to another compact electronic apparatus such as a word processor and the like.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electronic system comprising:
   an electronic apparatus including an electronic part, a battery mount portion having a first power terminal connected to the electronic part, and a first electrical connector electrically connected to the electronic part;
   a first battery pack removably mountable on the battery mount portion, the first battery pack having a second power terminal contactable with the first power terminal to supply electric power to the electronic part through the first and second power terminals when the first battery pack is mounted on the battery mount portion;
   a second battery pack removably mounted on the battery mount portion in place of the first battery pack, the second battery pack having a third power terminal contacting the first power terminal to supply electric power to the electronic part through the first and third power terminals when the second battery pack is mounted on the battery mount portion, and a fourth power terminal; and
   an expansion unit removably connected to the electronic apparatus and the second battery pack, the expansion unit including an expansion device for expanding a function of the electronic apparatus, a second electrical connector electrically connected to the expansion device and removably connected to the first electrical connector, and a fifth power terminal electrically connected to the expansion device, the fifth terminal contacting the fourth power terminal to supply electric power to the expansion device through the fourth and fifth power terminals when the second battery pack is connected to the expansion unit, the expansion device electrically connected to the electronic part through the first and second electrical connectors when the expansion unit is connected to the electronic apparatus.

2. An electronic system according to claim 1, which further comprises means for mechanically and removably connecting the expansion unit to the electronic apparatus, the connecting means maintaining the contact of the first and third power terminals and the contact of the first and second electrical connectors.

3. An electronic system according to claim 2, wherein the connecting means includes a bracket having a hook hole and a latch releasably engaging the hook hole to mechanically connect the expansion unit to the electronic apparatus.

4. An electronic system according to claim 3, wherein the bracket is removably connected the electronic apparatus and the latch is disposed at the expansion unit.

5. An electronic system according to claim 4, wherein the bracket further includes a guide pin and the expansion unit includes a guide hole so as to guide the mechanical connection between the electronic apparatus and the expansion unit.

6. An electronic system according to claim 5, which further comprises a bracket cover for covering the bracket when the electronic apparatus is used in a condition wherein the expansion unit is removed form the electronic apparatus and the bracket is left connected to the electronic apparatus.

7. An electronic system according to claim 2, wherein the connecting means includes a battery latch disposed on the second battery pack, a battery groove formed on the second battery pack and a groove engaging portion provided at the expansion unit, the battery latch releasably connects the second battery pack to the battery mount portion, the battery groove is releasably engaged with the groove engaging portion to mechanically connect the expansion unit to the second battery pack.

8. An electronic system according to claim 7, wherein the second battery pack includes a slide tab moving the battery latch between a latch position for connecting the second battery pack to the battery mount portion and a release position for releasing the connection between the second battery pack and the battery mount portion.

9. An electronic system according to claim 8, wherein the second battery pack includes a latch maintaining member temporarily maintaining the battery latch in the release position when the battery latch is moved from the latch position to the release position.

10. An electronic system according to claim 1, wherein the expansion device includes a hard-disk drive.

11. A portable computer system, comprising:
a portable computer including an external power terminal and a rear portion having a computer upper surface and a computer rear surface having a first electrical connector, the rear portion including a battery storing recess having a first power terminal and a bottom wall being lower than the upper surface;
a first battery pack removably storable in the battery storing recess, the first battery pack having a second power terminal contactable with the first power terminal to supply electric power to the portable computer, a first battery upper surface being flush with the computer upper surface and a first battery rear surface being flush with the computer rear surface when the first battery pack is stored in the battery storing recess;
a second battery pack removably stored in the battery storing recess in place of the first battery pack, the second battery pack having a third power terminal contacting the first power terminal to supply electric power to the portable computer through the first and third power terminals when the second battery pack is stored in the battery storing recess, and a fourth power terminal; and
an expansion unit removably connected to the portable computer and the second battery pack, the expansion unit including an expansion device for expanding a function of the portable computer, a second electrical connector electrically connected to the expansion device and removably connected to the first electrical connector, and a fifth power terminal electrically connected to the expansion device, the fifth terminal contacting the fourth power terminal to supply electric power to the expansion device through the fourth and fifth power terminals when the second battery pack is connected to the expansion unit, the expansion device electrically connected to the portable computer through the first and second electrical connectors when the expansion unit is connected to the portable computer.

12. A portable computer system according to claim 11, which further comprises a bracket removably connected to the computer rear surface and mechanically connecting the expansion unit to the portable computer.

13. A portable computer system according to claim 12, wherein the bracket includes a hook hole and the expansion unit includes a latch releasably engaging the hook hole.

14. A portable computer system according to claim 13, wherein the bracket further includes a guide pin and the expansion unit includes a guide hole so as to guide the mechanical connection between the portable computer and the expansion unit.

15. A portable computer system according to claim 14, which further comprises a bracket cover for covering the bracket when the portable computer is used in a condition wherein the expansion unit is removed form the portable computer and the bracket is left connected to the portable computer.

16. A portable computer system according to claim 11, wherein the second battery pack includes a battery latch and a battery groove, the expansion device further includes a groove engaging portion, the battery storing recess includes a latch engaging portion, the battery latch is releasably engaged with the latch engaging portion to removably fix the second battery pack in the battery storing recess when the second battery pack is stored in the battery storing recess, the battery groove is releasably engaged with the groove engaging portion to removably fix the second battery pack to the expansion unit when the second battery pack is connected to the expansion unit.

17. A portable computer system according to claim 16, wherein the second battery rear surface projects from the computer rear surface, the expansion unit has a unit groove for storing the rear surface.

18. A portable computer system according to claim 17, wherein the fourth power terminal is provided at the second battery rear surface, the fifth power terminal is provided at the unit groove.

19. A portable computer system according to claim 18, wherein the second battery pack includes a slide tab moving the battery latch between a latch position for engaging the battery latch and the latch engaging portion and a release position for releasing the connection between the battery latch and the latch engaging portion, and a latch maintaining member temporarily maintaining the battery latch in the release position when the battery latch is moved from the latch position to the release position.

20. A portable computer system according to claim 11, wherein the expansion unit includes a hard-disk drive.

* * * * *